United States Patent
Pearson et al.

(10) Patent No.: US 11,573,927 B1
(45) Date of Patent: Feb. 7, 2023

(54) METHOD AND SYSTEM FOR IMPLEMENTING HIDDEN SUBSCRIPTIONS IN A DISTRIBUTED COMPUTATION SYSTEM

(71) Applicant: Anaplan, Inc., San Francisco, CA (US)

(72) Inventors: George Duncan Pearson, York (GB); Jason Stephen Reich, York (GB)

(73) Assignee: ANAPLAN, INC., San Francisco, CA (US)

( * ) Notice: Subject to any disclaimer, the term of this patent is extended or adjusted under 35 U.S.C. 154(b) by 289 days.

(21) Appl. No.: 16/592,378

(22) Filed: Oct. 3, 2019

Related U.S. Application Data

(63) Continuation-in-part of application No. 16/176,522, filed on Oct. 31, 2018, now Pat. No. 11,281,683.

(51) Int. Cl.
*G06F 16/17* (2019.01)
*G06N 20/00* (2019.01)

(52) U.S. Cl.
CPC ......... *G06F 16/1734* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,381,605 B1 | 4/2002 | Kothuri | |
| 6,920,454 B1 | 7/2005 | Chan | |
| 7,877,376 B2 | 1/2011 | Thiyagarajan et al. | |
| 7,941,408 B2 | 5/2011 | Sinha | |
| 7,958,457 B1* | 6/2011 | Brandenberg | G01S 19/48 |
| | | | 715/789 |
| 8,151,056 B2 | 4/2012 | Gould | |
| 8,589,445 B2 | 11/2013 | Gould | |
| 9,411,853 B1 | 8/2016 | Dovrtel et al. | |
| 9,529,892 B2 | 12/2016 | Tibrewal | |
| 9,552,242 B1 | 1/2017 | Leshinsky et al. | |
| 9,710,501 B2 | 7/2017 | Walker | |
| 10,298,661 B2 | 5/2019 | Harries | |
| 10,467,245 B2 | 11/2019 | Sirer et al. | |
| 10,929,428 B1 | 2/2021 | Brahmadesam et al. | |
| 11,016,947 B1 | 5/2021 | Patel et al. | |
| 2003/0009551 A1 | 1/2003 | Benfield et al. | |
| 2003/0009552 A1 | 1/2003 | Benfield et al. | |
| 2004/0210608 A1 | 10/2004 | Lee et al. | |
| 2005/0005116 A1* | 1/2005 | Kasi | G06Q 10/10 |
| | | | 713/170 |
| 2005/0120062 A1 | 6/2005 | Sinha | |

(Continued)

OTHER PUBLICATIONS

International Search Report and Written Opinion issued in corresponding application No. PCTUS2019059235, dated Feb. 4, 2020. (15 pages).

(Continued)

*Primary Examiner* — Son T Hoang
(74) *Attorney, Agent, or Firm* — Chamberlain, Hrdlicka, White, Williams & Aughtry

(57) ABSTRACT

Embodiments of the invention relate to a method for managing subscriptions. The method includes monitoring a plurality of query requests executing on a plurality of query nodes, identifying, based on the monitoring, a query request of the plurality of query requests that satisfies a hidden subscription criterion, and generating a hidden subscription for the query request.

16 Claims, 16 Drawing Sheets

(56) References Cited

U.S. PATENT DOCUMENTS

| | | |
|---|---|---|
| 2006/0184519 A1 | 8/2006 | Smartt |
| 2007/0250492 A1* | 10/2007 | Angel .............. G06F 16/90324 |
| 2009/0055266 A1* | 2/2009 | Brody .................... G06Q 40/12 |
| | | 705/14.61 |
| 2009/0249290 A1 | 10/2009 | Jenkins |
| 2010/0000966 A1 | 1/2010 | Sakurai et al. |
| 2010/0009661 A1* | 1/2010 | Zhu ........................ H04L 51/38 |
| | | 455/412.1 |
| 2010/0100571 A1 | 4/2010 | Gould |
| 2010/0131715 A1 | 5/2010 | Gould |
| 2011/0047146 A1 | 2/2011 | Scott |
| 2011/0293096 A1 | 12/2011 | Reilly |
| 2012/0198198 A1 | 8/2012 | Gould |
| 2012/0290700 A1 | 11/2012 | Li et al. |
| 2013/0110911 A1 | 5/2013 | Chow |
| 2013/0117257 A1 | 5/2013 | Meijer |
| 2013/0311422 A1 | 11/2013 | Walker |
| 2014/0149392 A1* | 5/2014 | Wang ...................... G06F 16/93 |
| | | 707/722 |
| 2014/0156638 A1 | 6/2014 | Joshi |
| 2014/0180653 A1 | 6/2014 | Belmans |
| 2014/0215019 A1 | 7/2014 | Ahrens |
| 2014/0229470 A1 | 8/2014 | Smith-mickelson et al. |
| 2014/0279920 A1 | 9/2014 | Madhavarapu et al. |
| 2014/0365523 A1 | 12/2014 | Wagner |
| 2015/0012539 A1 | 1/2015 | Mchugh |
| 2015/0058324 A1* | 2/2015 | Kauwe .............. G06F 16/24575 |
| | | 707/722 |
| 2015/0067556 A1 | 3/2015 | Tibrewal |
| 2015/0100574 A1 | 4/2015 | Presta et al. |
| 2015/0347450 A1 | 12/2015 | Phelan |
| 2016/0050269 A1 | 2/2016 | Botticelli |
| 2016/0085809 A1 | 3/2016 | De Castro Alves |
| 2016/0124857 A1 | 5/2016 | Parr |
| 2016/0217519 A1* | 7/2016 | Kozat ..................... H04W 4/06 |
| 2016/0255139 A1* | 9/2016 | Rathod ................... H04L 67/42 |
| | | 709/203 |
| 2016/0321376 A1 | 11/2016 | Taylor |
| 2016/0350363 A1 | 12/2016 | Raja et al. |
| 2017/0012815 A1 | 1/2017 | Nekrestyanov et al. |
| 2017/0024912 A1 | 1/2017 | De Castro Alves |
| 2017/0364699 A1 | 12/2017 | Goldfarb et al. |
| 2018/0096027 A1* | 4/2018 | Romero .............. G06F 16/9535 |
| 2018/0173767 A1 | 6/2018 | Langseth et al. |
| 2018/0232422 A1 | 8/2018 | Park |
| 2018/0246926 A1 | 8/2018 | Altaf |
| 2018/0260409 A1 | 9/2018 | Sundar |
| 2018/0300350 A1 | 10/2018 | Mainali |
| 2019/0147078 A1 | 5/2019 | Dageville |
| 2019/0236215 A1 | 8/2019 | Agarwal et al. |
| 2019/0294724 A1 | 9/2019 | Michelis |
| 2020/0104181 A1 | 4/2020 | Pyati et al. |
| 2020/0151577 A1 | 5/2020 | Ogawa |
| 2021/0011914 A1 | 1/2021 | Pearson et al. |

OTHER PUBLICATIONS

Lars George, HBase: The Definitive Guide, HBase: The Definitive Guide, Sep. 23, 2011, 1-524, ISBN: 978-1-4493-9610-7, O'Reilly Media, Incorporated, Sebastopol, XP055662278 (115 pages).

Silu Huang et al, OrpheusDB: Bolt-on Versioning for Relational Databases, OrpheusDB: Bolt-on Versioning for Relational Databases, Mar. 7, 2017, rxiv.org, Cornell University Library, 2010 Lin Library Cornell University Ithaca, NY 14853, DOI: 10.14778/3115404.3115417, Cornell University Library, 2010 Lin Library Cornell University, NY 14853 (63 pages).

International Search Report and Written Opinion dated Dec. 8, 2020, for PCT/US2020/054157 filed on Oct. 2, 2020.

* cited by examiner

METHOD AND SYSTEM FOR IMPLEMENTING HIDDEN SUBSCRIPTIONS IN A DISTRIBUTED COMPUTATION SYSTEM

CROSS-REFERENCE TO RELATED APPLICATIONS

This application is a continuation-in-part of U.S. patent application Ser. No. 16/176,522 filed on Oct. 31, 2018. U.S. patent application Ser. No. 16/176,522 is hereby incorporated by reference in its entirety.

BACKGROUND

Companies collect large amounts of data about their own operations. This data is then analyzed to determine, among other things, how to improve the operation of the company and/or how to plan for the future operation of the company. The traditional approach to efficiently analyzing data (or data sets) is to load the data (or data sets) into memory and then analyze the in-memory data. As the size of data sets that need to be analyzed has grown, the traditional approach has become impractical or at a minimum cost prohibitive. Specifically, in order to keep all of the data in memory, a larger amount of memory needs to be provisioned and additional overhead needs to be expended in order to ensure that the data in the memory is current. Further, as the size of the data set increases, it is difficult to efficiently and effectively scale the hardware and software infrastructure necessary to analyze the larger data set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

SUMMARY

In general, in one aspect, the invention relates to a method for managing subscriptions, comprising monitoring a plurality of query requests executing on a plurality of query nodes, identifying, based on the monitoring, a query request of the plurality of query requests that satisfies a hidden subscription criterion, and generating a hidden subscription for the query request.

In general, in one aspect, the invention relates to a non-transitory computer readable medium comprising computer readable program code, which when executed by a computer processor enables the computer processor to perform a method for managing subscriptions, the method comprising monitoring a plurality of query requests executing on a plurality of query nodes, identifying, based on the monitoring, a query request of the plurality of query requests that satisfies a hidden subscription criterion, and generating a hidden subscription for the query request.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing distributed calculations. More specifically, embodiments of the invention relate to distributing management of the data to be analyzed across query nodes in the query system and also distributing the servicing of a query request across one or more query nodes. Further, embodiments of the invention are directed to implementing a subscription service that may be used to initiate query requests in the query system and, in certain scenarios block execution of query requests.

Figure 1A:
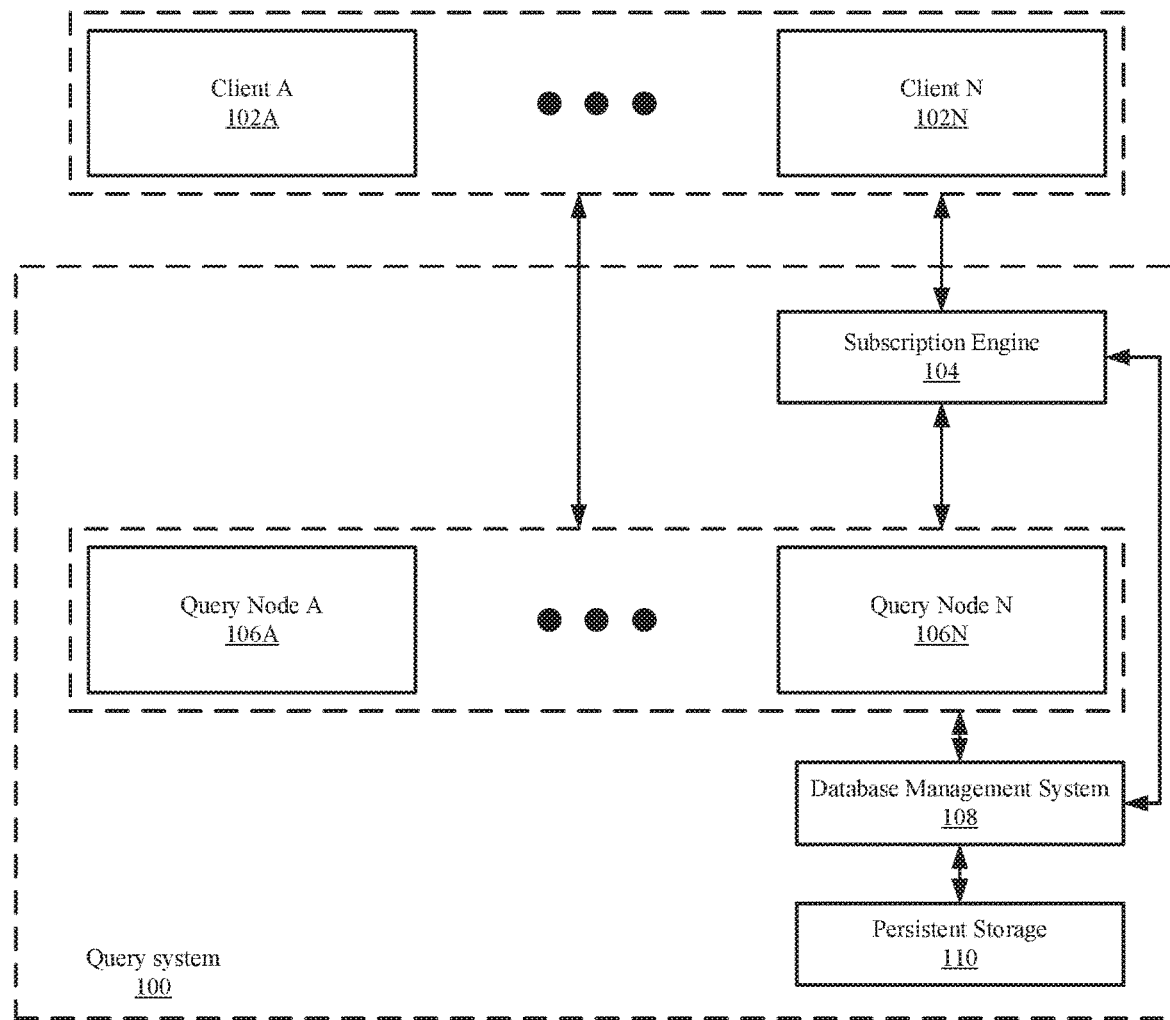
FIG. 1A shows a diagram of a system in accordance with one or more embodiments of the invention.

FIG. 1A shows a diagram of a system in accordance with one or more embodiments of the invention. The system includes a query system (100) interacting with one or more clients (102A, 102N). The components illustrated in FIG. 1A may be connected via any number of operable connections supported by any combination of wired and/or wireless networks. Each component of the system of FIG. 1A (including the individual components in the query system) may be operably connected via any combination of wired and/or wireless connections. Each component of the system of FIG. 1A is discussed below.

In one embodiment of the invention, clients (102A, 120N) are configured to issue query request to the query system (or to a specific query node in the query system), to receive query responses, and to interact with the subscription engine (described below).

In one or more embodiments of the invention, zero, one or more clients (102A, 102N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 8.

In one or more embodiments of the invention, the zero, one or more clients (102A, 102N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

In one or more embodiments of the invention, query system (100) includes one or more query nodes (106A, 106N), a database management system (DBMS) (108), persistent storage (110), and a subscription engine (104). Each of these components is described below.

Figure 1B:
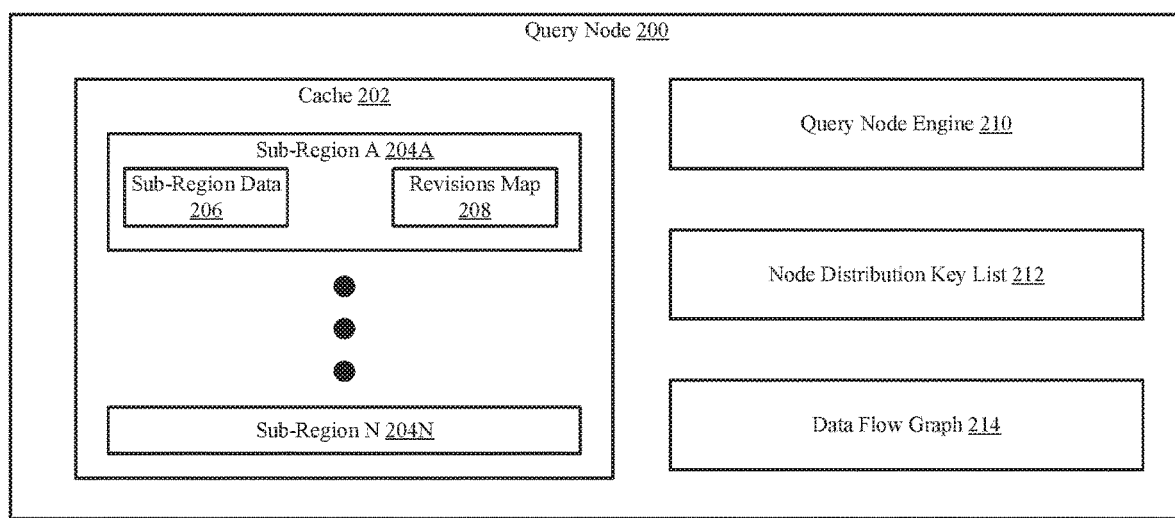
FIG. 1B shows a diagram of a query node in accordance with one or more embodiments of the invention.
Figure 1C:
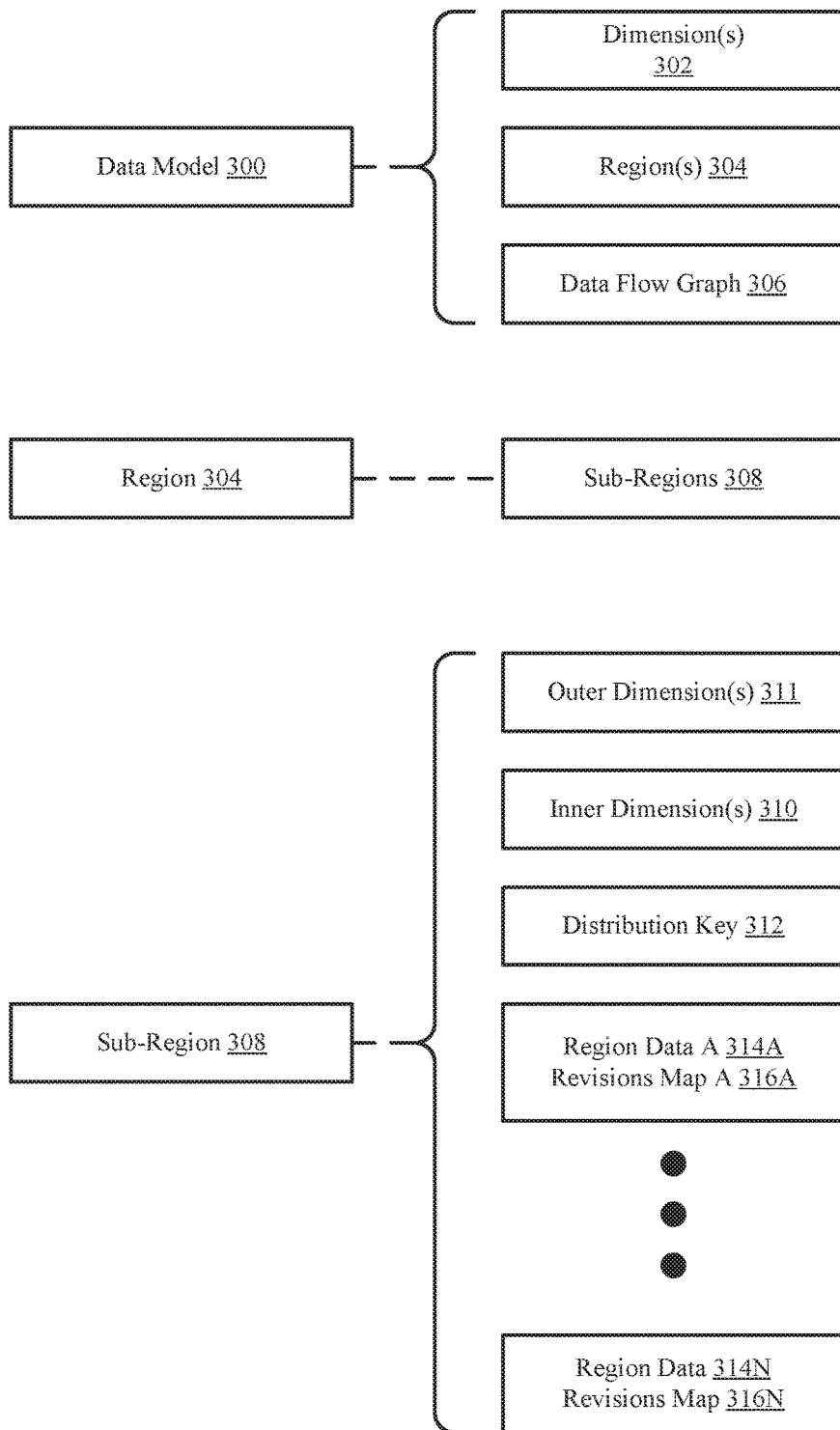
FIG. 1C shows relationships between various elements in the system in accordance with one or more embodiments of the invention.
Figure 2:
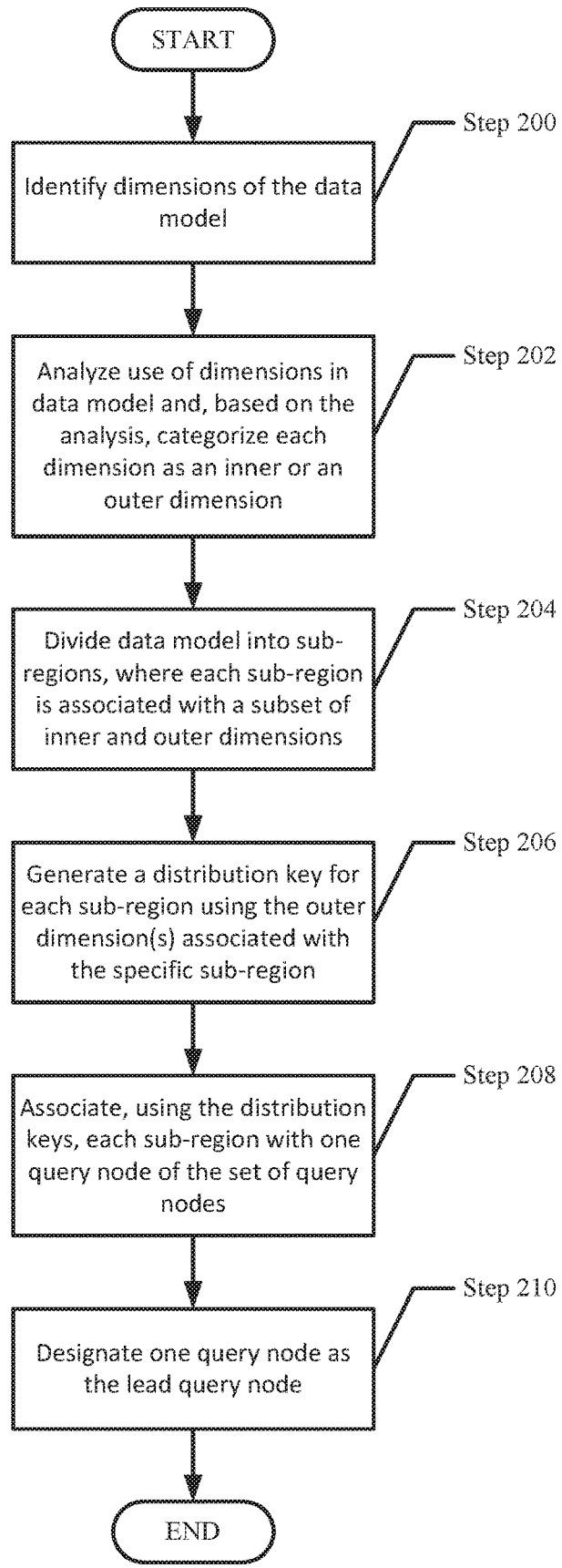
FIG. 2 shows a flowchart of a method of configuring the system in accordance with one or more embodiments of the invention.

In one or more embodiments of the invention, each query node (106A, 106N) may be configured to perform all or a portion of the method shown in FIG. 2 in order to configure the query system to service query requested. Further, each query node (106A, 106N) may also be configured to service query requests that may originate from a client (102A, 102N), from the subscription engine (104), and/or for another query node (106A, 106N). Servicing the query requests by the query nodes may be performed recursively in accordance with FIGS. 3A-3C. In addition, each of the query nodes may include functionality to be designated as the lead query node and, when it is designated as such, manage the distribution of sub-regions among the query nodes. Additional detail about the distribution of sub-regions is provided below in, e.g., FIGS. 1B, 1C, and 2.

In one or more embodiments of the invention, zero, one or more query nodes (106A, 106N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 8.

In one or more embodiments of the invention, the zero, one or more query nodes (106A, 106N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

Additional details about the query nodes are provided in FIGS. 1B and 2-3C below.

In one embodiment of the invention, the database management system (DBMS) (108) provides an interface between other components of the query system (e.g., the query nodes, and the subscription engine) and the persistent storage. More specifically, DBMS (108) is configured to receive requests for data stored in the persistent storage, retrieve the requested data from the persistent storage, and provide the retrieved data to the requesting entity (e.g., a query node). In various embodiments of the invention, the DBMS is also configured to store data (which may be user data or derived data) in the persistent storage and, in certain scenarios, issue notifications to the subscription engine (104) when particular user data is stored in the persistent storage or a request is made to store user data in the persistent storage (additional detail described below). The DBMS (108) may be implemented using any protocol currently known or later developed. Those skilled in the art will appreciate that management software, other than a DBMS may be used without departing from the invention. In one embodiment of the invention, the DBMS may be implemented on a computing device (see e.g., FIG. 8) or as a logical device (e.g., a virtual machine, a container, etc.).

In one embodiment of the invention, the persistent storage (110) includes any form of non-volatile storage media that may store data (e.g., user data and derived data). Examples of persistent storage may include, but are not limited to, magnetic storage, optical storage, solid state memory, or any combination thereof. In one embodiment of the invention, the data stored in persistent storage may be user data and derived data. Depending on the implementation of the invention, the persistent storage may store the user data and not store the derived data.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

Each piece of data stored in the persistent storage is associated with a sub-region. Further, each piece of data or sub-region may be associated with a version(s). If the data is user data or if the sub-region is a user data sub-region (i.e., a sub-region that only includes user data), then the version (which may be represented as a number) corresponds to the version of the data. The version may be referred to as a revisions map. The initial version of the user data or user data sub-region is, e.g., one and each time there is any change to the user data or the user data sub-region (e.g., an addition, deletion, or modification), then an updated copy of the user data or user data sub-region is stored and the version associated with the updated copy of the user data or user data sub-region is incremented (or updated). In this manner, the persistent storage may include multiple copies of a particular piece of user data or particular user data sub-region each associated with their own version number.

If the data is derived data or if the sub-region is a derived data sub-region (i.e., a sub-region that only includes derived data), then the version (which may be represented as a number) corresponds to the version(s) of the user data that was used to generate (directly or indirectly) the derived data or derived data sub-region. The version or versions of user data from which the derived data is directly or indirectly derived may be referred to as a revisions map. The initial version of the derived data or derived data sub-region is, e.g., one and each time the derived data is recalculated, then the resulting derived data or derived data sub-region is stored and the version(s) of the underlying user data are recorded. In this manner, the persistent storage may include multiple copies of a particular piece of derived data or particular derived sub-region each associated with their own version number. For example, consider a scenario in which, at a first time, derived data (DD1) is calculated using user data A version 1 (UDAv1) and user data B version 2 (UDBv2). Accordingly, the persistent storage stores DD1 along with the following revisions map: [UDAv1, USBv2]. At a second point in time, user data B is updated resulting user data B version 3 being stored in the persistent storage. At a third point in time, the derived data is recalculated (e.g., in response to a query request) the resulting derived data (DD2) may be stored in persistent storage along with the following revisions map: [UDAv1, UDv3]. The example is not intended to limit the scope of the invention.

Continuing with the discussion of FIG. 1A, in one embodiment of the invention, the subscription engine (104) is configured to receive requests from the clients (102A, 102B) to issue query requests when there is a change to the user data associated with the query request. More specifically, each query request is associated target sub-region (e.g., the specific data that is responsive the query request) and each target sub-region is associated (directly or indirectly) with user data. When there is a change to such user data, the subscription engine may initiate the corresponding query request. For each query request that the subscription engine is monitoring, the subscription engine monitors the user data associated with the query request. In one or more embodiments of the invention, monitoring the user data may include receiving a notification from the DBMS (108) each time any user data has changed. In such scenarios, the subscription engine may process each notification to determine whether the user data that has change is associated with any of the query requests that it is monitoring. If user data is associated with one or more query requests, then the subscription engine either: (i) issues the query request to the query system (e.g., to a query node), receives a query result and then provides the query result directly (or indirectly) to the appropriate client), or (ii) notifies the appropriate client(s) (i.e., the client(s) that requested that the subscription engine monitor the query request), where the client(s) subsequently issues the appropriate query request to the query node.

In another scenario, the subscription engine (104) may, for each query request it is monitoring, specify to the DBMS (108) which user data sub-regions (i.e., sub-regions with user data) to monitor. In this scenario, the DBMS may only notify the subscription engine of user data changes to the user data sub-regions specified by the subscription engine. When a notification is received by the DBMS (108), the subscription engine may be process each notification to determine the associated query request(s) (if any). Once the associated query request(s) is identified, then the subscription engine either: (i) issues the query request to the query system (e.g., to a query node), receives a query result, and provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node. Additional detail about the management of subscriptions is described in FIGS. 5-7 below.

In one embodiment of the invention, the subscription engine may be implemented on a computing device (see e.g., FIG. 8) or as a logical device (e.g., a virtual machine, a container, etc.).

FIG. 1B shows a diagram of a query node in accordance with one or more embodiments of the invention. In one embodiment of the invention, the query node (200) includes a cache (202), a query node engine (210), a node distribution key list (212), and a data flow graph (214). Each of these components is described below.

In one embodiment of the invention, the cache (202) is volatile memory (e.g., random access memory) that stores data associated with one or more sub-regions (204A, 204N). More specifically, data stored in the cache that is associated with a sub-region (i.e., sub-region data (206)) may be user data or derived data. Further, the sub-region data (206) is associated with a revisions map (208). More specifically, each piece of data (user data or derived data) is associated with a sub-region and a revisions map (208) (or a relevant portion thereof, see e.g., FIGS. 4A-C) (as described above in FIG. 1A). Accordingly, for a given piece of data or sub-region, there may be multiple different versions each associated with their own unique revisions map. Additional detail about sub-regions is provided below in FIG. 1C. The manner in which data is stored in the cache and the manner in which data is removed and/or added to the cache may vary based on the implementation of the invention. Further, the mechanism used to manage a cache on a given query node may be the same or different than the mechanism used to manage the cache on a different query node. Moreover, the caching used in the query system does not require the caches on the query nodes to be consistent and/or coherent.

Figure 3A:
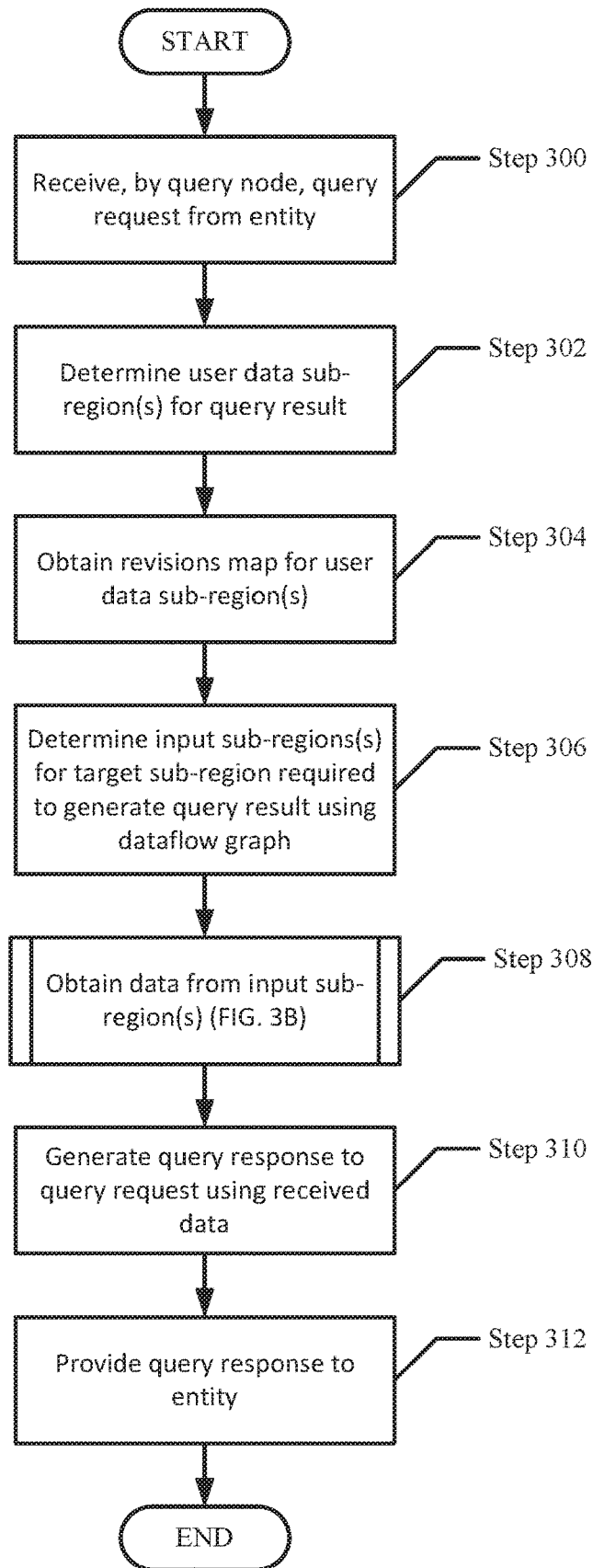
FIGS. 3A-3C show flowcharts for servicing a query request from a client in accordance with one or more embodiments of the invention.
Figure 3B:
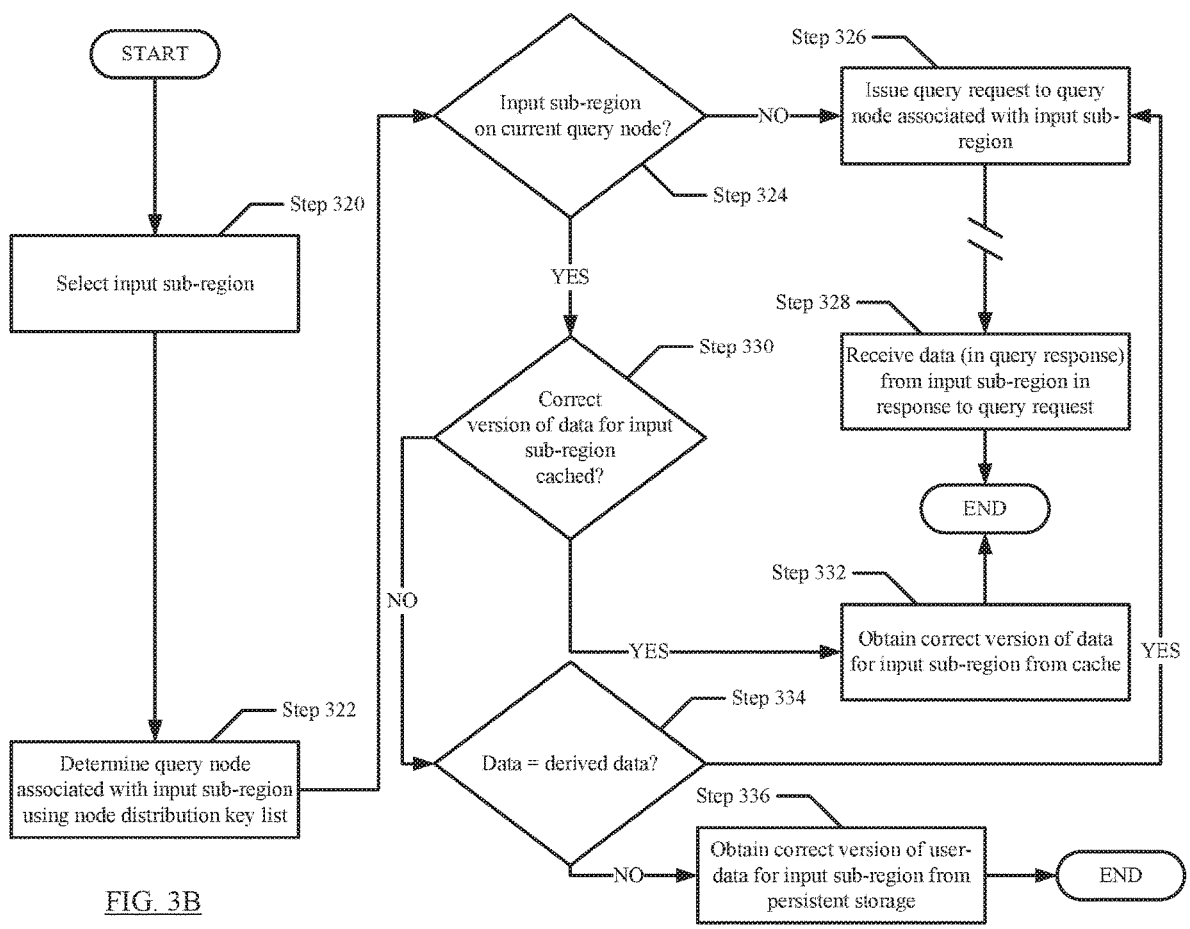
Figure 3C:
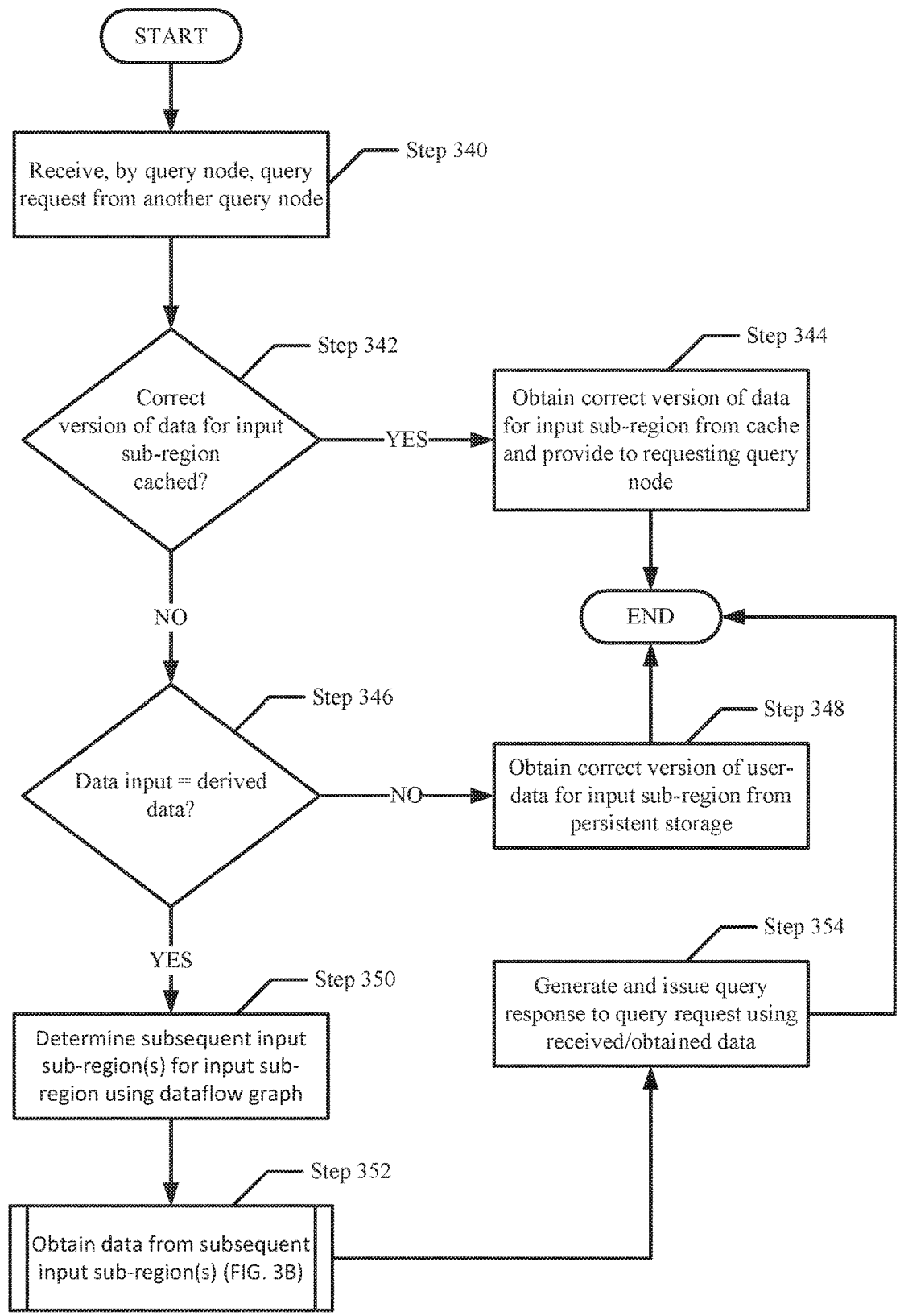

In one embodiment of the invention, the query node engine (210) is configured to perform all or a portion of the functionality described in FIGS. 2-3C.

In one embodiment of the invention, the node distribution key list (212) specifies a list of node distribution keys associated with each query node in the query system. The generation, operation, and use of the distribution key and the node distribution key list are described below with respect to FIGS. 2-3C.

In one embodiment of the invention, the data flow graph (214) specifies the relationships between the regions and/or sub-regions (where the specific granularity of the data flow graph may vary based on the implementation of the invention). More specifically, in one embodiment of the invention, the data is stored in the query system based on a data model. The data model may specify, among other information, what data is stored and the relationships between the stored data. Additional details about the data flow graph and the data model is described in FIG. 1C.

FIG. 1C shows relationships between various elements in the system in accordance with one or more embodiments of the invention.

As discussed above, the data is stored in the query system in accordance with a data model (300). In one embodiment of the invention, data is stored in cells, where each cell is associated one or more dimensions (302). The dimensions are specified by the data model (300) and define what specific data is stored within a given cell. Each of the cells is associated with a region (304), where the data model may specify multiple regions (304). Said another way, the data stored in accordance with the data model may be grouped into regions (304), where each region includes multiple cells. Further, the relationship between the regions (or sub-regions) is specified using a data flow graph (306). The data flow graph may specify whether a given cell includes user data or derived data. If a given cell includes derived data, the data flow graph may specify: (i) what user data and/or derived data are inputs to the particular cell (i.e., are input to generating the derived data of the cell) and (ii) the function (which may be mathematical function or algorithm) is used to combine the aforementioned inputs. An example of a data flow graph in shown in FIG. 4B.

Each region (304) may be divided into two or more sub-regions (308). Each sub-region for a given region may have the same outer dimension(s) but different inner dimensions. For example, consider a scenario in which a given region is associated with a time dimension (specified as months of the year) and a geographic location dimension, which specifies North America, South America, Europe, Asia, Africa, and Australia. In this example, the outer dimension is time and the inner dimension is geographic location. Accordingly, if the region was to be divided into sub-regions, then each sub-region would be associated with a same time dimension but a different geographic location (e.g., North America, South America, Europe, Asia, Africa, or Australia).

Continuing with the discussion of FIG. 1C, each sub-region (308) is associated with one or more outer dimensions (302), one or more inner dimensions (304), a distribution key (312), and one or more sets of data (referred to as sub-region data) (314A, 314N), where the data is associated with corresponding revisions map (316A, 316N) (as described above). Additional detail about the designation of a dimension as an inner or outer dimension is provided in FIG. 2. In one embodiment of the invention, the distribution key (312) is generated by applying a function to at least one outer dimension associated with the sub-region. The function may be, for example, a consistent hashing function. The use of the distribution key is described below in FIGS. 2-3C.

While the system of FIGS. 1A-1C has been illustrated as including a limited number of components for the sake of brevity, the system may include additional components (not shown), fewer components, and/or different components (not shown) without departing from the invention.

FIGS. 2-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3C may be performed in parallel with any other steps shown in FIGS. 2-3C without departing from the scope of the invention.

FIG. 2 shows a flowchart of a method of configuring the system in accordance with one or more embodiments of the invention. All or a portion of the method shown in FIG. 2 may be performed by one or more of the query nodes and/or another computing device or logical device that is external to the query system.

Turning to FIG. 2, prior to step 200, a data model has been obtained and/or specified. Details about the data model are provided above with respect to FIG. 1C.

In Step 200, the dimensions of the data model are identified. As discussed above, each region is associated with one or more dimensions. Each dimension may specify an item, measure, or characteristic of data that can be obtained, calculated or manipulated. Examples of dimensions may include, but are not limited to, geographic location, time, organization, users, versions, etc. The dimensions may correspond to default dimensions specified by the query system (or by another system or entity) and/or dimensions that are created by users.

In Step 202, the dimensions for the data model are analyzed in order to categorize the dimensions as outer dimensions and inner dimensions. The analysis may include using the data flow graph and the data model to determine the dimensions associated with region and how data from one region impacts data in another region(s). While the query requests may be processed using a combination of query nodes (see e.g., FIGS. 3A-3C), the query results may be obtained in a more efficient manner if there is less inter-query node communication (i.e., there are fewer query requests issued between the query nodes). Based on the analysis of the data model and the data flow diagram, the dimensions may be categorized in a manner that minimizes or attempts to minimize the inter-query node communication.

Specifically, in one embodiment of the invention, the distribution of sub-regions across the query nodes is based on the outer dimension(s) of the sub-regions. In such implementations, all sub-regions that are associated with the same outer dimension(s) are located on the same query node. Accordingly, based on the data model and the data flow graph, the outer dimension may be specified such that directly related sub-regions (e.g., sub-regions that are connected by an edge in the data flow graph, see e.g., FIG. 4B, sub-region A and sub-region B) are located on the same query node.

Other heuristics and/or analysis may be performed to categorize the dimensions as inner dimensions and outer dimensions without departing from the invention.

Continuing with the discussion of FIG. 2, in Step 204, the data model is divided into sub-regions, where each sub-region is associated with at least one outer dimension and at least one inner dimension. For each sub-region, the value of outer dimension(s) is constant while the inner dimension(s) may vary. For example, if the data model includes the following dimensions: geographic location and time. Based on the analysis in step 202, time may be specified as an inner dimension and geographic location may be specified as an outer dimension. In this example, each sub-region may be associated with a specific value for the outer dimension e.g., North America, South America, Africa, Asia, Europe, or Australia, but be associated with varying values for a time dimension. Accordingly, if sub-region A is associated with an outer dimension of Africa, then all data in this sub-region is associated with the geographic location of Africa but with different time periods (e.g., January, February, March, etc.). Those skilled in the art will appreciate that the invention is not limited to the aforementioned example.

Continuing with the discussion of FIG. 2, in Step 206, a distribution key is generated for each sub-region (i.e., the sub-regions resulting from Step 204). Each distribution key may be generated using a function, such as, a consistent hashing function with the outer dimension(s) of the sub-regions being used as an input(s) to the function. By using the outer dimension(s) of the sub-regions as the input(s) to the function, all sub-regions with the same outer dimension(s) will have the same value for their distribution key.

In Step 208, each of the distribution keys is associated with one of the query nodes. The distribution keys may be spread symmetrically or asymmetrically across the query nodes in order to balance the load of process query requests across the query system. Any known method or later discovered method may be used to associate keys to particular query nodes without departing from the invention. The result of the process in step 208 is a global distribution key list. This global distribution key list specifies which distribution keys are associated with which query nodes.

In Step 210, one of the query nodes in the query system is designated as the lead query node. The query node, in various implementations of the invention, may include functionality to: (i) send to all query nodes in the query system (or at least to the query nodes that are specified in the global distribution key list) the global distribution key list; (ii) update the global distribution key list during the operation of the query system to account for changes in the loads experienced by the various query nodes and/or to address issues (e.g., failures or degraded operation) of one or more of the query nodes and (iii) to propagate updates of the global distribution key list to the various non-leader query nodes. For purposes of this disclosure, each query node maintains its own distribution key list (referred to as a node distribution key list), which is intended to be the same as the global distribution key list; however, due to potential latency issues in the propagation of updates to the global distribution key list, the node distribution key list on a given query node may be inconsistent (for at least period of time) with the global distribution key list. By using the node distribution key lists and maintaining redundant copies of the node distribution key list, the query system is not limited to all query nodes attempting to access a single copy of the node distribution key list, thereby making the query system fault tolerant. Specifically, if the lead query node fails or becomes unavailable, the query system will continue to operate by (i) designating a new lead query node and (ii) updating the global distribution key list to move all sub-regions that were previously managed by the failed query node to other active query nodes in the query system.

Continuing with the discussion of FIG. 2, after configuration of the query system (e.g., using the method shown in FIG. 2), the query system may service query requests in accordance with FIGS. 3A-3C.

FIGS. 3A-3C show flowcharts for recursively servicing a query request from a client in accordance with one or more embodiments of the invention. All or a portion of the method shown in FIGS. 3A-3C may be performed by one or more of the query nodes. Further, different sets of query nodes in the query system may be concurrently servicing different query requests using the method described in FIGS. 3A-3C.

The method shown in FIG. 3A is from the perspective of the query node that received the query request from a client or the subscription engine. The method shown in FIG. 3B is from the perspective of a query node, which may or may not be query node that received the query request. FIG. 3C is from the perspective of other query nodes in the system that assisting in servicing the query request but that did not receive the initial query request from the client or the subscription engine.

Turning to FIG. 3A, in Step 300, a query request is received by the query node. The query request may specify a specific sub-region (referred to as the target sub-region). In this context, the data in the target sub-region corresponds to the data that is being requested via the query request. The query request may, but is not required to, specify a particular version of user data (which may be different per user data) to use to service the query request. If no version of user data is specified (or new version is specified for particular user data), then the query request may use the current version (or the newest version) of such user data to service the query request. The query request may be issued by an entity, where the entity may be client or the subscription engine.

In Step 302, the user data sub-region(s) for the query are determined. More specifically, the data flow graph may be analyzed to determine the underlying user data region(s) that are required to ultimately calculate the data in the target sub-region.

In Step 304, the revisions map for the user data sub-regions is obtained. In one embodiment of the invention, the query node may issue a revisions map request, which specifies the user data sub-regions, to the DBMS (see e.g., FIG. 1A, 108). In response to the request, the DBMS obtains and subsequently provides the revisions map to the query node. The revisions map, as discussed above, specifies a version number (or other identifier) for each user data sub-region.

In one embodiment of the invention, the query node may issue a revisions map request, which specifies the user data sub-regions and some other criteria, to the DBMS (see e.g., FIG. 1A, 108). The criteria may specify a time, date, or other criterion that may be used to identify a specific version of one or more user data sub-regions. For example, the revisions map request may specify "January 2018" for user data sub-region A. In response to the request, the DBMS obtains and subsequently provides the revisions map to the query node, where the revisions map specifies a version number for user data sub-region A that corresponds to January 2018. The above example is not intended to limit the scope of the invention.

In Step 306, the input sub-regions for the target sub-region are determined. The input sub-regions correspond to sub-regions, as specified in the data flow graph, which include data (which may be derived data or user data) that is used as input to the target sub-region.

In Step 308, the data is obtained from each of the identified input sub-regions (see e.g., FIG. 3B). The data may be obtained from the cache in the query node, from persistent storage, or from another query node.

In Step 310, one or more functions (e.g., mathematical functions or algorithms) are applied to the data obtained in step 308 is to generate data for the target sub-region. The resulting data is then used to generate a query response, where the query response may include the data associated with the target sub-region.

In Step 312, the query response is provided to entity that issued the query request or to another entity. For example, the query response may be issued to the client that initiated the query request, to the subscription engine that initiated the query request, or to a client where the query request was issued by the subscription engine for the client.

Referring to FIG. 3B, FIG. 3B shows a method for obtaining data from the input sub-regions identified in Step 306. The method shown in FIG. 3B is performed (concurrently, serially, or some combination thereof) for all of the input sub-regions identified in Step 306 or step 352 (below).

Turning to FIG. 3B, in Step 320, an input sub-region is selected. In Step 322, the query node that is managing the selected input sub-region is determined using the node distribution key list on the query node (which may the global distribution key list if the query node is the leader query node). In one embodiment of the invention, the outer dimension(s) of the input sub-region are used as input to a function (e.g., a consistent hashing function) to determine a distribution key for the input sub-region. The node distribution key list on the query node is then queried with the distribution key to identify the query node that is managing the input sub-region.

In Step 324, a determination is made about whether the query node identified in step 322 is the current query node (i.e., the query node that performed step 322). If the query node identified in step 322 is the current query node, then the process proceeds to step 330; otherwise, the current query node is not managing the input sub-region and, as such, the process proceeds to step 326.

In Step 326, the current query node issues a query request to the query node with is identified in step 322. Once the query request is issued, the current query node waits until it receives a response (in step 328) from the query node to which it issued a query request. The query request issued in step 326 specifies the input sub-region and the revisions map (i.e., the revisions map from step 304) (or a portion thereof).

In Step 328, a response to the query request is received, where the response includes the data associated with the selected input sub-region. If the data for the input sub-region is user data, then the received data corresponds to the user data version specified in the revisions map (e.g., if the revisions map specified version 2 of user data for the input sub-region, then the received data is version 2 of the user data) (or a portion thereof). If the data for the input sub-region is derived data, then the received data corresponds to the derived data that is directly or indirectly generated using the user data version specified in the revisions map (e.g., if the revisions map specified version 2 of user data for the input sub-region, then the received data is directly or indirectly derived from version 2 of the user data) (or a portion thereof). The data obtained via the query response may be stored in the cache of the query node along with the corresponding revisions map (or portion thereof). The process then ends.

Referring back from Step 324, if the query node identified in step 322 is the current query node, then in Step 330 a determination is made about whether the correct version of the data associated with the input sub-region is present in the cache. As discussed above, the cache may store multiple versions of data (which may be user data or derived data) for a given sub-region, where each version is associated with a revisions map. Accordingly, the determination in step 330 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 332; otherwise, the process proceeds to step 334.

In Step 332, the correct version of the data associated with the input sub-region is obtained from the cache. The process then ends.

Referred back to Step 330, if the correct version of the data associated with the input sub-region is not present in the cache, then in Step 334 a determination is made about whether the data for the selected input region is user data or derived data. If the data for the selected input region is user data, then the process proceeds to step 336; otherwise, the process proceeds to step 326.

In Step 336, the correct version of the data associated with the input sub-region is obtained from the persistent storage. The data obtained from the persistent storage may be stored in the cache of the query node along with the corresponding revisions map (or portion thereof). The process then ends.

Referring to FIG. 3C, FIG. 3C shows a method for servicing inter-query node query requests (i.e., query requests issued in Step 326).

Turning to Step 340, in step 340, a query request is received by a query node from another query node.

In Step 342, a determination is made about whether the correct version of the data associated with the input sub-region is present in the cache. As discussed above, the cache may store multiple versions of data for given sub-region, where each version is associated with a revisions map. Accordingly, the determination in step 342 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 344; otherwise, the process proceeds to step 346.

In Step 344, the correct version of the data associated with the input sub-region is obtained from the cache and then sent back, via a query response, to the query node that issued the query request received in step 340. The process then ends.

Referred back to Step 342, if the correct version of the data associated with the input sub-region is not present in the cache, then in Step 346 a determination is made about whether the data for the selected input region is user data or derived data. If the data for the selected input region is user data, then the process proceeds to step 348; otherwise, the process proceeds to step 350.

In Step 348, the correct version of the data associated with the input sub-region is obtained from the persistent storage and then sent back, via a query response, to the query node that issued the query request received in step 340. The data obtained from the persistent storage may be stored in the cache of the query node along with the corresponding revisions map (or portion thereof). The process then ends.

If the data is derived data, then in Step 350, a subsequent input sub-region(s) is determined for the input sub-region specified in the query request obtained in step 340. The subsequent input sub-region corresponds to the sub-region (s), as specified in the data flow graph, which includes data (which may be derived data or user data) that is used an input into the input sub-region. The process then proceeds to step 352.

In Step 352, the data is obtained from each of the identified subsequent input sub-regions (see e.g., FIG. 3B). The data may be obtained from the cache in the query node, from persistent storage, or from another query node. The process then proceeds to step 354.

In Step 354, a query response is generated using the data obtained in steps 352. The query response is then issued to the query node that issue the query request received in step 340.

Example 1

Figure 4A:
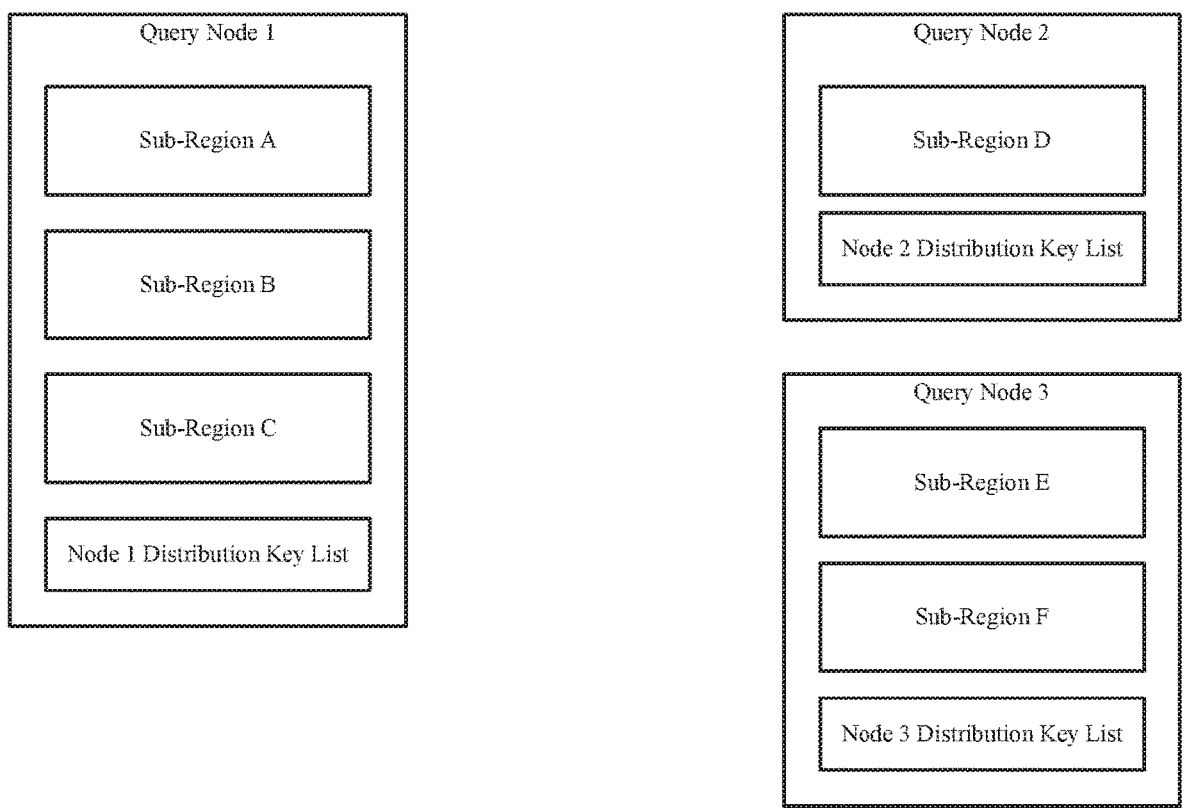
FIGS. 4A-4C shows an example in accordance with one or more embodiments of the invention.
Figure 4B:
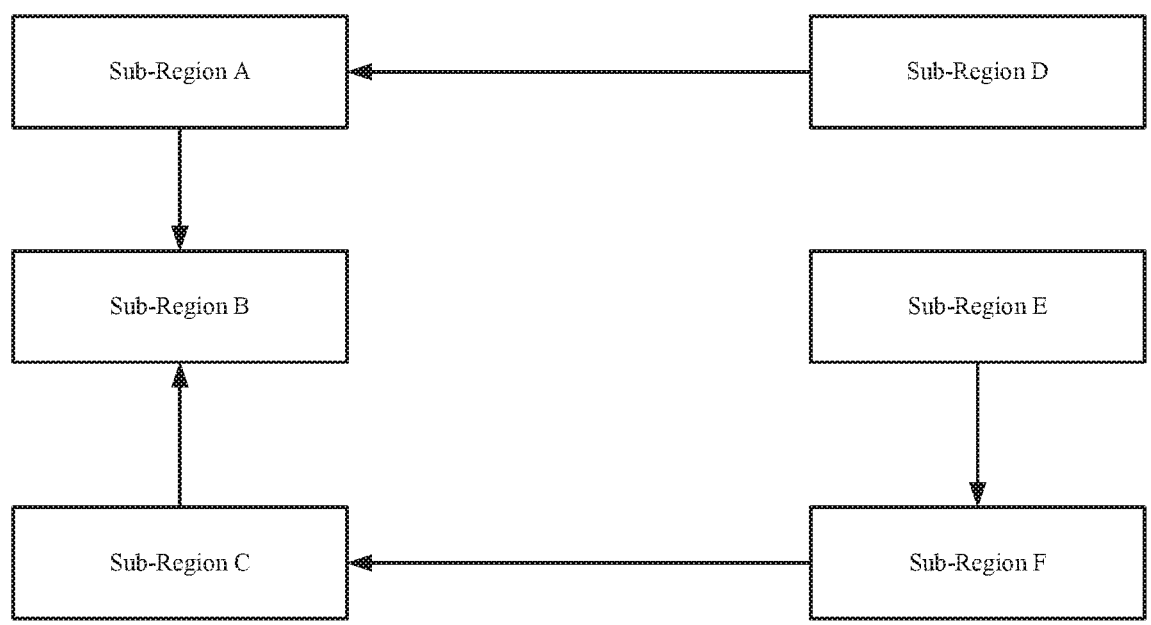
Figure 4C:
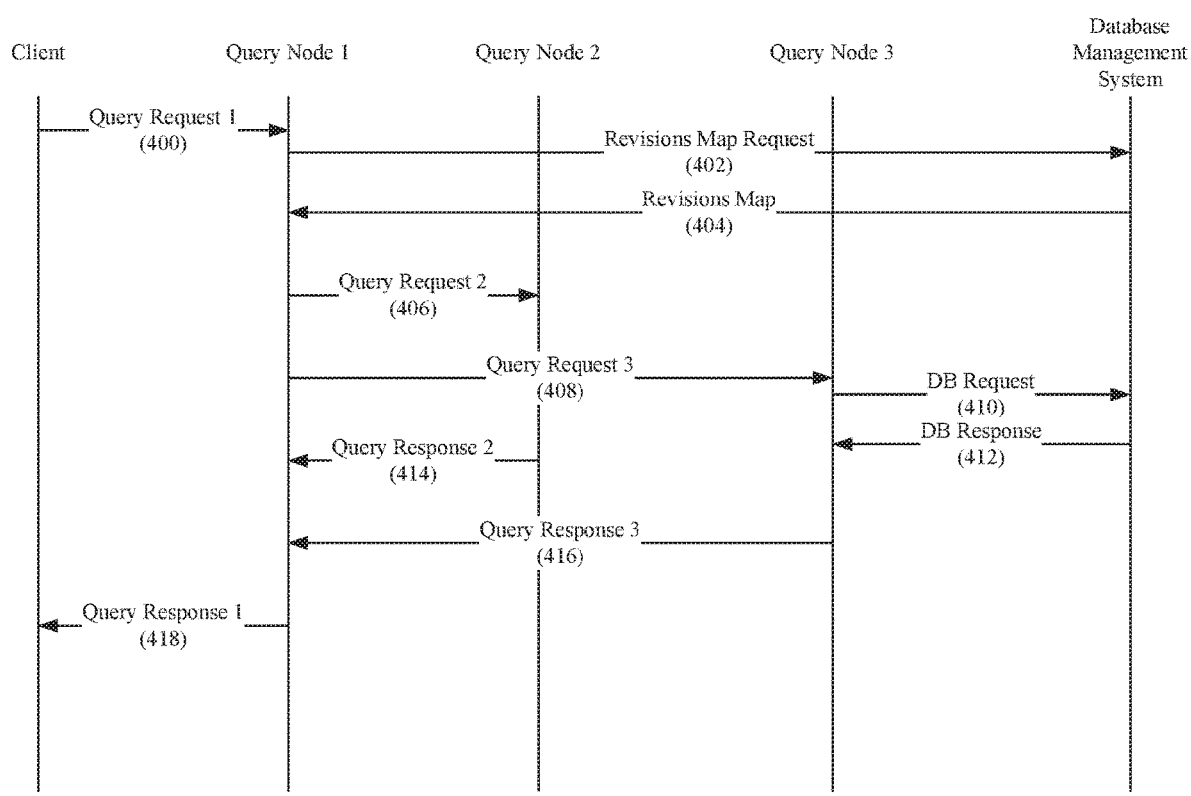

FIGS. 4A-4C shows an example in accordance with one or more embodiments of the invention. The following example is used to illustrate the servicing of a query request in accordance with FIGS. 3A-3C but is not intended to limit the scope of the invention.

Referring to FIG. 4A, consider a scenario in which the query system includes three query nodes, namely, query node 1, query node 2, and query node 3. Further, the data model is divided, in accordance with the method shown in FIG. 2, into six sub-regions, namely, sub-region A (SRA), sub-region B (SRB), sub-region C (SRC), sub-region D (SRD), sub-region E (SRE), and sub-region F (SRF). In this example, the sub-regions are distributed across the query nodes as follows: query node 1 manages SRA, SRB, and SRC; query node 2 manages SRD, and query node 3 manages SRE, and SRF. Each of the query nodes includes its own node distribution key list, which specifies which query node manages each of the aforementioned sub-regions.

Referring to FIG. 4B, FIG. 4B shows a data flow graph depicting the relationship between the aforementioned sub-regions. Specifically, in this example, SRA, SRB, SRC, and SRF are sub-regions that include derived data while sub-regions SRD and SRE include user data. Further, the input sub-region for SRF is SRE, the input sub-region for SRA is SRD, the input sub-region for SRC is SRF, and the input sub-regions for SRB are SRA and SRC.

Referring to FIG. 4C, consider a scenario in which a client issues query request 1 (400) to query node 1. Query request 1 specifies a target sub-region as SRB but does not specify any specific version of user data to use for servicing the query request. Accordingly, recent version (which may be the most current version) of user data is used as, in this example, the default version of user data is used when no specific version of the user data is specified.

Query node 1, using the data flow graph (see e.g., FIG. 4B) determines that the user data sub-regions associated with SRB are SRD and SRE. In response to this determination, query node 1 issues a revisions map request (402) to the Database Management System (DBMS) for the current version of user data associated with SRD and SRE. The DBMS provides a revisions map (404) in response to the revisions map request, the revisions map (404) specifies the following [SRDv3, SREv1].

Query node 1 then determines that the input sub-regions for SRB are SRA and SRC. For SRA, the query node determines that SRA is managed by query node 1 using the node 1 distribution key list and a distribution key for SRA. As SRA is managed by query node 1, the cache on query node 1 is searched to determine whether it includes data for SRA that is associated with SRDv3. In this example, the cache does not include this data. Accordingly, query node 1 subsequently determines that the input sub-region for SRA is SRD. In response to this determination, query node 1 calculates a distribution key for SRD using the outer dimension of SRD. The node 1 distribution key list in combination with the distribution key for SRD is used to identify that query node 2 manages SRD. Accordingly, query node 1 issues query request 2 (406) to query node 2 for the data in SRD associated with SRDv3.

For SRC, the query node 2 determines that SRC is managed by query node 1 using the node 1 distribution key list and a distribution key for SRC. As SRC is managed by query node 1, the cache on query node 2 is searched to determine whether it includes data for SRC that is associated with SREv1. In this example, the cache does not include this data. Accordingly, query node 1 subsequently determines that the input sub-region for SRC is SRF. In response this determinations, query node 2 calculates a distribution key for SRF using the outer dimension of SRF. The node 2 distribution key list in combination with the distribution key for SRF is used to identify that query node 3 manages SRF. Accordingly, query node 2 issues query request 3 (408) to query node 3 for the data in SRF associated with SREv1.

Query node 3 subsequently receives query request 3 (408). Query node 3 determines that the cache on query node 3 does not include data for SRF that is associated with SREv1 and that the input sub-region for SRF is SRE. In response to the two aforementioned determinations, query node 3 calculates a distribution key for SRE using the outer dimension of SRE. The node 3 distribution key list in combination with the distribution key for SRE is used to identify that query node 3 manages SRE.

Based on this determination, query node 3 searches the cache on query node 3 to determine whether data for SRE associated with SREv1 is present in the cache. In this example, the data for SRE associated with SREv1 is not present in the cache and, as a result, query node 3 issues a DB request (410) to the DBMS which includes revisions map [SREv1]. A DBMS response (412) with the data for SRE associated with [SREv1] is received from the DBMS. The received data along with the following revisions map [SREv1] is stored in the cache on query node 3.

At some later point in time, query node 2 obtains data for SRD associated with SREv1 from its cache and transmits the data (via query response 2 (414)) to query node 1. Further, query node 3 generates data for SRF using the data for SRE associated with [SREv1] and transmits the generated data (via query response 3 (416)) to query node 1.

Upon receipt of query response 2, query node 1 generates data for SRA using the data for SRD associated with [SRDv3] and upon receipt of query response 3, query node 1 generates data for SRC using the data for SRF associated with [SREv1]. The newly generated data for SRA (with an association to SRDv3) and SRC (with an association to SREv1) is cached in query node 1.

Finally, the generated data for SRA and SRC is used to generate the data for SRB. The resulting data for SRB is then transmitted to the client via query response 1. SRB is also cached and associated with [SRDv3, SREv1].

End of Example 1

As discussed above, the query nodes include functionality to service query requests and generate query responses. The query requests may be initiated by a client and/or by the subscription engine. The following section describes additional embodiments of the invention directed to the setup and operation of the subscription engine.

In one embodiment of the invention, the subscriptions allow users (via a client), without having to continuously issue query requests to the query system, to receive updated query results for specific query requests when user datum (or user data) associated with a query request is modified. However, there may be scenarios in which a user datum (or user data) associated with a query request is modified but this modification has no impact on the query result. For example, if a user wants to be notified if the value of X changes, where X=f (user datum A, user datum B). In one implementation of the invention, if either user datum A or user datum B changes, a query request would be issued to calculate the resulting value of X. However, if X does not change (i.e., the value of X before the modification of user datum A or user datum B and the value of X after the modification of user datum A or user datum B is the same), then the query request was serviced by the query system but did not result in any change in X; however, computing resources were utilized to service the query request. One or more embodiments of the invention may prevent or decrease the issuance of query requests that result in no ultimate change to the query response by using subscription barriers.

In general, subscription barriers take into account: (i) the datum (or data) that triggered the subscription and (ii) the calculations (or mathematical operations) that are performed on the datum (or data) in order to generate the query result. Other information may be considered without departing from the invention. The aforementioned information is then used to determine, without execution of the corresponding query request, whether the ultimate query result will change (relative to the last calculation of the query result). If ultimate query result does not change, then the subscription barrier prevents execution of the query request as its execution will only utilize computing resources of the query nodes without generating any change to the ultimate query result. As such, the query nodes do not need to service the corresponding query request. In this manner, the subscription barrier can prevent unnecessary execution of certain query requests that are associated with subscriptions, thereby improving the performance of the query system and without changing the experience for the user (i.e., the user is still updated in scenarios in which the query result changes). The following section describes embodiments for generating and using subscription barriers in accordance with one or more embodiments of the invention.

Figure 5:
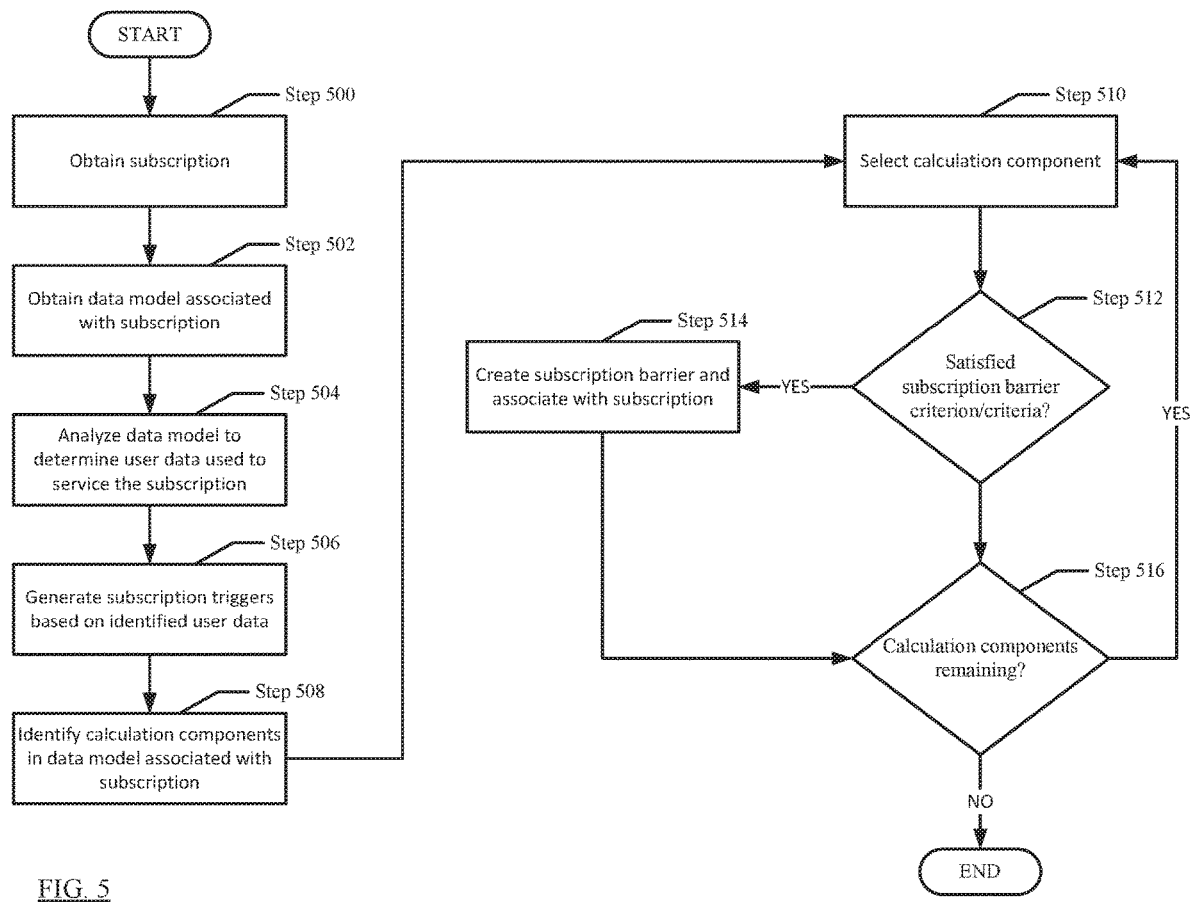
FIG. 5 shows a flowchart for generating subscription barriers in accordance with one or more embodiments of the invention.

Turning to FIG. 5, FIG. 5 shows a flowchart for generating subscription barriers in accordance with one or more embodiments of the invention. The method shown in FIG. 5 may be performed by the subscription engine. However, another component of the query system may perform the method without departing from the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5-7 may be performed in parallel with any other steps shown in FIGS. 5-7 without departing from the scope of the invention.

In step 500, a subscription is obtained. The subscription may be obtained from a user (via a client). The subscription may specify one or more of the following: (i) a target-sub region of data model (e.g., the specific derived datum or derived data) that the user is interested in and (ii) an identifier of the user and/or the client (which is used to determine where to send the query result). Additional and/or different information may be included within the subscription without departing from the invention.

In step 502, a data model (see e.g., FIG. 1C) associated with the target sub-region is identified and subsequently obtained.

In step 504, the data model is then analyzed to determine what user datum (or user data) is required to service the subscription. More specifically, a data flow graph in the data model may be analyzed in order to determine on which user data sub-regions the target sub-regions depends. This may be performed by traversing the data flow graph until the encountered sub-regions correspond to user data sub-regions. For example, referring to FIG. 4B, if the subscription specifies target sub-region B, then the user data that is required to service the subscription is in sub-regions D and E. Accordingly, in this example, the analysis of the data model would result in the identification of sub-regions D and E.

In step 506, once the user data (e.g., the user data sub-regions) are identified, one or more subscription triggers are generated. In one embodiment of the invention, one subscription trigger is generated for each subscription, where the subscription trigger specifies the user data (or, more specifically, the user data sub-regions) identified in step 504. In another embodiment of the invention, one subscription trigger is created for each user datum (or more specifically, for each user data sub region) identified in step 504. The subscription trigger(s) is then associated with the subscription. Each subscription trigger may monitor events generated by the DBMS (see e.g., FIG. 1A) and determine whether the events are associated with the user datum (or user data) that the subscription trigger is monitoring. Additional detail about the use of the subscription triggers is provided below in FIG. 6A.

Continuing with the discussion of FIG. 5, in step 508, one or more calculation components within the data model are identified, where the calculation components are required to service the query request associated with the subscription (i.e., required to directly or indirectly calculate values in the target sub-region specified by the subscription). In one embodiment of the invention, a calculation component includes a mathematical function (which may be arbitrarily complex) and at least one input, which may be user datum, derived datum, or a combination thereof. The result of step 508 is a set of calculation components. The calculation components are then analyzed in accordance with steps 510-516 in order to generate zero, one or more subscription barriers for the subscription.

In step 510, an unprocessed calculation component is selected from the set of calculation components obtained in step 508.

In step 512, the selected calculation component is analyzed to determine whether it satisfies a subscription barrier criterion or criteria. Specifically, the calculation component is analyzed to determine whether a modification to user datum (or user data) that is directly or indirectly associated with the calculation component will (or will not) impact the result generated by the calculation component.

Non-limiting examples of criterion that may be consider include: (i) the calculation component includes a multiplication by zero, (ii) the calculation component includes a Boolean test with an AND operator where one input to the AND operator is False; (iii) the calculation component includes a Boolean test with an OR operator where one input to the OR operator is True; (iv) the presence of a Round operator (which takes a real number as input and returns a number, which may be same or different than the real number, that is approximately equal to the real number), (v) the presence of a Floor operator (which takes a real number as input and returns the largest integer that is less than the real number), and (vi) the presence of a Ceiling operator (which take a real number as input and return lowest integer that is greater than or equal to the real number).

The following is another non-limiting example of a subscription barrier in accordance with one or more embodiments of the invention. For example, consider a scenario in which a subscription is associated with a data model that includes various cell dependencies. The data model may be analyzed to determine the specific cell dependencies. Zero, one, or more subscription barriers may then be created using the dependency information. The created subscription barriers may specify that when there is a change to a particular cell(s) in the data model (e.g., an event that triggers a subscription, see FIG. 6A, 600, 602), the subscription barrier prevents processing of the subscription if the change in the cell(s) does not change the result(s) in the cells that hold that data that is being requested by the subscription. Said another way, the subscription barrier(s) is able to prevent subscriptions from being processed if the cells that are of interest to the subscription are not dependent (as defined by an associated data model) on the cells (i.e., the cells with changed data) that triggered the method shown in FIG. 6A.

Other subscription barrier criterion/criteria may be used without departing from the invention.

Continuing with the discussion of step 512, if one or more subscription barrier criterion/criteria is satisfied, then process proceeds to step 514; otherwise, the process proceeds to step 516.

In step 514, a subscription barrier is generated based on the analysis of the calculation component and then associated with the subscription. The subscription barrier may be implemented as a conditional statement or a set of conditional statements. The conditional statement(s) may be implemented using computer executable code (such as a script).

The specific implementation of the subscription barrier may vary based on the calculation component on which it is based. For instance, the subscription barrier may always block continued execution of the query request or it may specify one or more conditions that need to be satisfied in order permit or deny continued execution of a query request. For example, if the calculation component includes a multiplication by zero, then the subscription barrier may always block continued execution of the query request. However, if the calculation component includes a Round operator, then the subscription barrier may specify a change threshold to determine whether to proceed or block execution of query request. For example, if the change in the user datum (or user data) is relatively small, then a Round operator will effectively mask the change in user data and, as such, the ultimate query result will not be impacted. In this example, the subscription barrier may specify that if the user datum has been modified such that it's value has increased more than 10% relative to its last value, then the query request should proceed; however, if the user data has changed less than 10% then execution of the query result should be block. The aforementioned example is not intended to limit the invention.

Continuing with the discussion of FIG. 5, in step 516, a determination is made about whether there are any additional calculation components to process. If there are additional calculation components to process, the method proceeds to step 510; otherwise, the process ends.

The method shown in FIG. 5 includes the generation of subscription barriers using a static analysis. Said another way, the data model is analyzed with the results of the analysis being used to generate zero, one, or more subscription barriers. In certain instances, the static analysis may not be able to identify all applicable subscription barriers. In view of this, subscription barriers may also be generated dynamically using query results that are generated in response to the servicing of query requests associated with subscriptions (See e.g., FIG. 6C). By using both static analysis and online analysis, embodiments of the invention enable initial performance improvement using static analysis and then potentially additional performance improvement using the online analysis. Further, the online analysis may also aid users in identifying other subscription barrier criterion/criteria, which may then be used to update and improve the static analysis described above FIG. 5.

While the embodiment shown in FIG. 5 is directed to the generation of subscription barriers on a per-subscription basis, in another embodiment of the invention the subscription barriers may be generated on a per-data model basis. For example, a data model may be analyzed to determine whether any of its calculation components form the basis for a subscription barrier. Based on the analysis, the data model (as opposed to a subscription associated with the data model) is associated with zero, one, or more subscription barriers. In this scenario, when a subscription is received, the data model associated with the subscription is determined and then the set of subscription barriers (if any) associated with the data model are obtained. These subscription barriers (if any) may then be analyzed to determine if any of them are based on calculation components that are required to service the subscription. Any identified subscription barriers are then associated with the subscription.

Figure 6A:
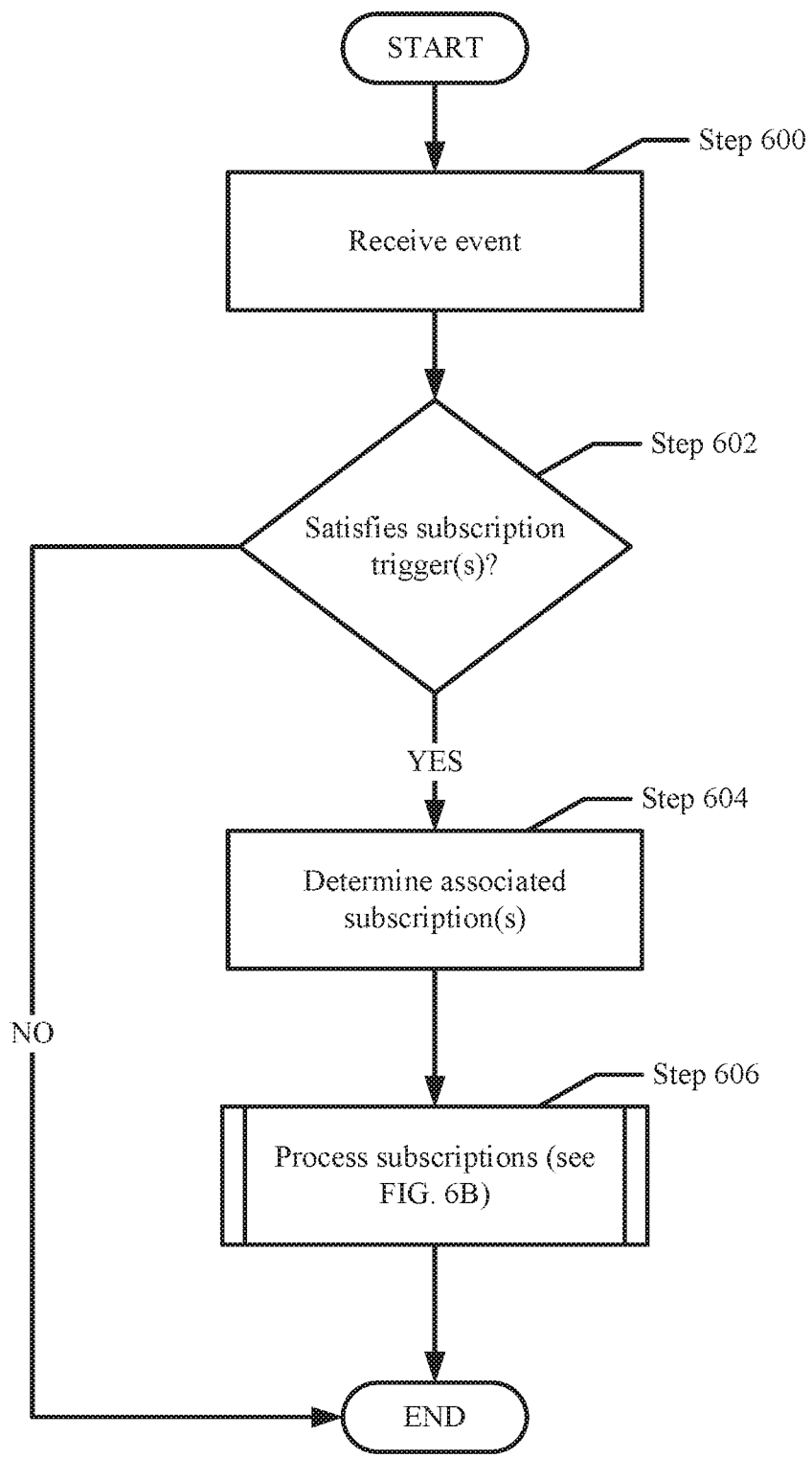
FIGS. 6A-6C show flowcharts for executing subscriptions in accordance with one or more embodiments of the invention.
Figure 6B:
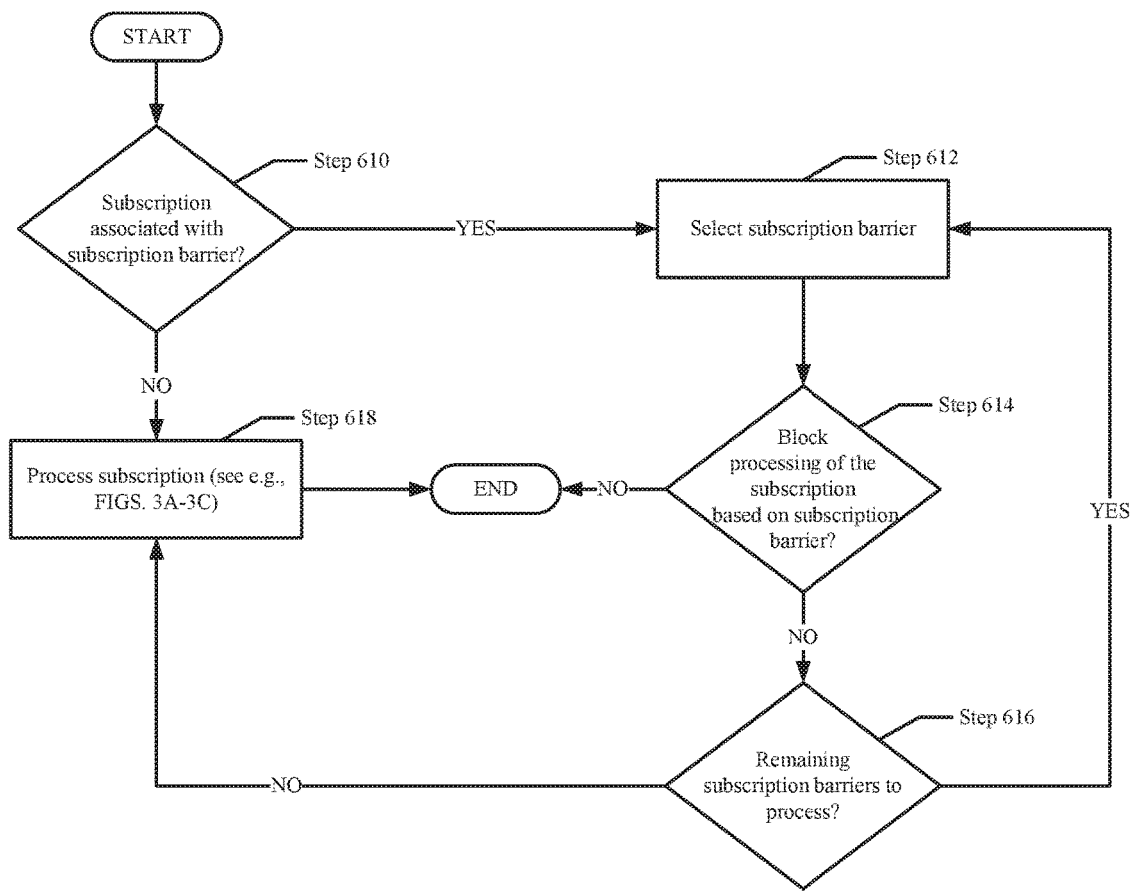
Figure 6C:
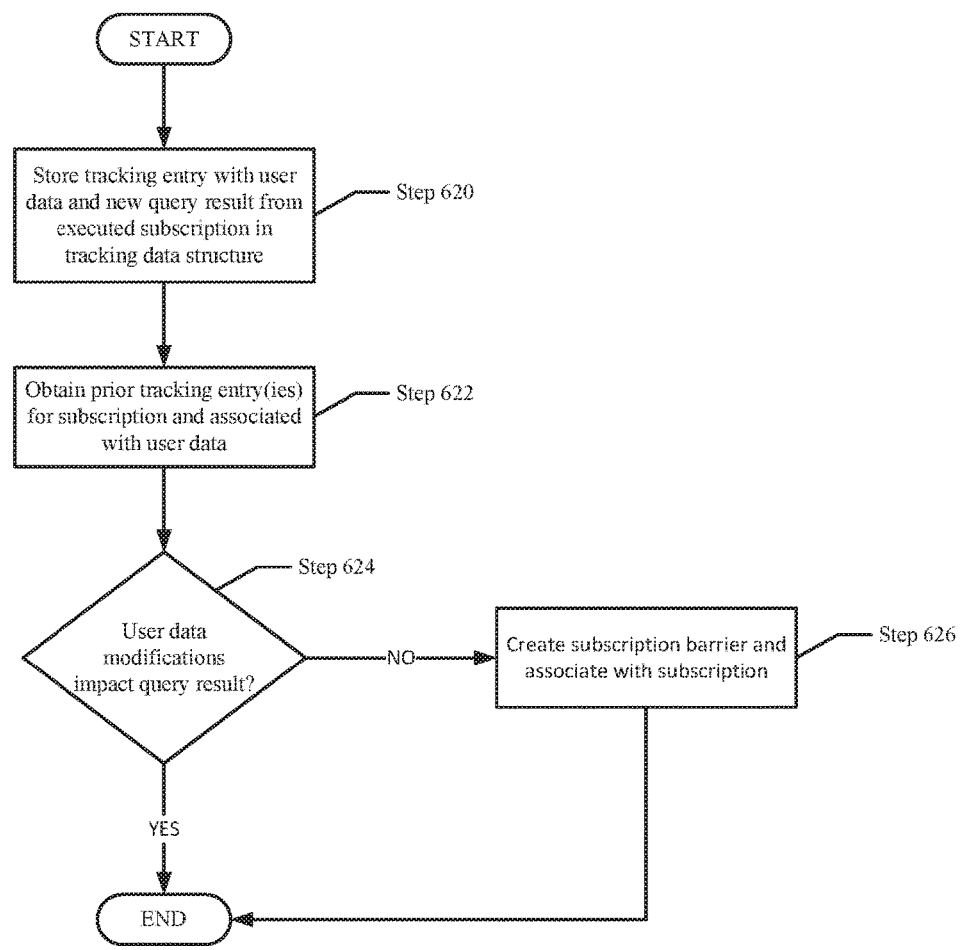

FIGS. 6A-6C show flowcharts for executing subscriptions in accordance with one or more embodiments of the invention. The method shown in FIG. 6A may be performed by the subscription engine. Other components in the query system may perform the method in FIG. 6A without departing from the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5-7 may be performed in parallel with any other steps shown in FIGS. 5-7 without departing from the scope of the invention.

Turning to FIG. 6A, in step 600, an event is received by the subscription engine. The event includes information about a change to a user datum (or user data) in the persistent storage (110). The user datum or data that has been changed may be identified by specifying, e.g., a user data sub-region in which the changed datum or data is located. The event may be generated by the DBMS (e.g., FIG. 1A, 108) or another process monitoring the persistent storage (See e.g., FIG. 1A, 110).

In step 602, a determination is made about whether any of the subscription triggers are satisfied. As discussed above, each of the subscription triggers specifies one or more user datum (or user data). A subscription trigger is satisfied if the event is associated with the user datum (or user data) specified in the subscription trigger. For each subscription trigger that is satisfied, the process proceeds to Step 604; otherwise the process ends.

In step 604, for each subscription trigger that is satisfied in step 602 an associated subscription is identified. The associated subscription may be specified within the subscription trigger or may be mapped to the subscription trigger in a data structure that is maintained by the subscription engine (or another component in the query system). In scenarios in which a data structure is used, the data structure may include a mapping between subscription trigger identifier(s) and the subscription identifiers.

In step 606, the subscriptions identified in step 604 are then processed. One embodiment for processing the subscriptions is described in FIG. 6B.

The method shown in FIG. 6A may be performed each time an event is received by the subscription engine (or by the component performing the method shown in FIG. 6A).

FIG. 6B shows a method for processing subscriptions in accordance with one or more embodiments of the invention. The method shown in FIG. 6B may be performed by the subscription engine. Other components in the query system may perform the method in FIG. 6B without departing from the invention. Further, the method shown in FIG. 6B may be performed on the identified subscriptions serially, in parallel, or using a combination thereof. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5-7 may be performed in parallel with any other steps shown in FIGS. 5-7 without departing from the scope of the invention.

Turning to FIG. 6B, in step 610 a determination is made about whether one or more subscription barriers are associated with the subscription. If there are any subscription barriers associated with the subscription, the process proceeds to step 612; otherwise, the process proceeds to step 618.

In step 612, an unprocessed subscription barrier associated with subscription is selected.

In step 614, a determination is made about whether to block processing of the subscription based on the subscription barrier. In one embodiment, this determination is made by evaluating the subscription barrier. The evaluation of the subscription barrier may include evaluating one or more conditional statements (which may be arbitrarily complex) to determine whether the processing the subscription based on the modified user datum (or data) will generate a different query response. The determination may use the value(s) of the modified user datum (or user data) as input in making the determination. If a determination is made, based on the evaluation, to block the processing of the subscription, the process ends; otherwise, the process proceeds to step 616.

In step 616, a determination is made about whether there are any remaining subscription barriers to process. If there are remaining subscription barriers to evaluate, the process proceeds to step 612; otherwise, the process proceeds to step 618.

In step 618, the subscription is executed (or processed) by issuing a query request (which is based on the subscription) to a query node in the query system. The query request is then processed in accordance with FIGS. 3A-3C. The query response may be subsequently sent to: (i) the client that provided the subscription to the query system, (ii) a client specified in subscription; or (iii) subscription engine (or another component in the query system), which subsequently provides the query result to a client.

The method shown in FIG. 6B blocks processing of a subscription if any of the subscription barriers are determined to block the processing of the subscription. In this embodiment, the order in which the subscription barriers are evaluation may be set such that subscription barriers that require less computing resources to evaluate are evaluated prior to subscription barriers that require more computing resources to evaluate.

In another embodiment of the invention, the processing of the subscription may only be blocked if the evaluation of all subscription barriers indicates that the processing of subscription should be block. In this scenario, if the evaluation of any of the subscription barriers indicates that the subscription should be processed, then the subscription is processed.

FIG. 6C shows a flowchart for the online generation of subscription barriers in accordance with one or more embodiments of the invention. The method shown in FIG. 6C may be performed by the subscription engine. Other components in the query system may perform the method in FIG. 6C without departing from the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5-7 may be performed in parallel with any other steps shown in FIGS. 5-7 without departing from the scope of the invention.

Turning to FIG. 6C, in step 620 a tracking data structure is maintained that includes entries, each of which specify: (i) the subscription (or information that identifies the subscription); (ii) user data that triggered the processing of the subscription (e.g., the user data sub-region that includes the modified user data as well as information about the value(s) of the user data) and (iii) the query response (i.e., values of the target sub-region) resulting from execution of a query request using the user data in (ii). The tracking data structure may be an in-memory data structure and/or a data structure stored in persistent storage.

In step 622, all entries associated with the subscription and with a particular user data sub-region are identified. Said another way, all entries that were triggered based on a modification to a particular user datum (or data) for a particular subscription are identified.

In step 624, the identified entries are then used to determine whether the modification of the user data impacts the query result. For example, consider a scenario in which the following occurs: (i) subscription A is processed a first time using user data value A to generate a value of X in a target sub-region; (ii) subscription A is processed a second time using user data value B to generate a value of X in a target sub-region; and (iii) subscription A is processed a third time using user data value C to generate a value of X in a target sub-region. In the above scenario, the changing value of the user data, which is triggering execution of the subscription, is not impacting the query result. This example is not intended to limit the scope of the invention.

The analysis of the identified entries may be performed using machine learning, any other data analysis technique, or any combination thereof.

If the user data modifications do not impact the query results zero, one or more subscription barriers may be generated and the process proceeds to step 626; otherwise, the process ends.

In step 626, zero, one or more subscription barriers are created and associated with the appropriate subscription. While the processing in step 624 may indicate that modifications to user data are not impacting the query responses, additional analysis of the data model (or portions thereof) may need to be performed in order to determine why this is occurring. If this additional analysis, which may be automated or manual, identifies the cause of the query responses to not be impacted, then a further determination is made about whether one or more subscription barriers may be created that is able to block execution of the query requests based on the identified cause. If one or more subscription barriers can be created, then they are created and associated with the subscription (or the data model associated with the subscription (as discussed above)).

While the method shown in FIG. 6C is depicted as sequential processing of the tracking data structure, step 620 may be continuously performed as query requests are issued and query responses are generated. Further, steps 622-626 may be performed (serially or in parallel) for different sets of identified entries in order to generate subscription barriers for one or more subscriptions.

Further, in other embodiments of the invention, instead of maintaining a global tracking data structuring, there may be one tracking data structure for each of the subscriptions and/or for each of the data models. In these scenarios, the method shown in FIG. 6C may be performed independently for each of the aforementioned data structures.

As discussed above, subscriptions may be used by clients (or more specifically users of clients) to obtain the most current information for a given target sub-region without having to constantly issue query requests. However, in order to ensure that the subscriptions do not over utilize the computing resources of the query system, subscription barriers may be used to block the processing of the subscriptions where the modifications to the user data on which the subscriptions are triggered do not change the value target sub-region associated with the subscription.

However, in other embodiments of the invention, subscriptions may be used as a cache management mechanism to keep certain user data and derived data in the query node caches (see e.g., FIG. 1B). More specifically, as discussed above, the query nodes include a cache, where the cache is updated as query requests are processed by the query nodes (see e.g., FIG. 3A-3C). If data that is required to process the query request is stored in the cache, then the processing of the query request is more efficient as compared to scenarios in which the required data is not stored in the cache. However, because the caches are a finite resource, they tend to fill up quickly and, as result, data (user data or derived data) that is not being used or that has not been used recently is removed from the cache to free up space for other data that is being used.

Embodiments of the invention provide a mechanism to manage the content of the cache such that the data required for the query node is present in the cache when the query node processes a query request. More specifically, embodiments of the invention create and execute hidden subscriptions in order to ensure that certain data is present in caches of the appropriate query nodes.

In one embodiment of the invention, a hidden subscription is a subscription that is generated by the subscription engine (or another component in the query system) and scheduled to execute at a specified time (e.g., at specific times and days) and/or when other criterion/criteria are satisfied. Unlike the subscription processing described above, the result of processing the query request is not sent to any client (or to any user via a client); rather, the query request is executed in order to either maintain (or store if not already present) data associated with the query request in the appropriate caches (see e.g., FIG. 3A-3C). In this manner, when the query request is issued by a client, the query system will be able to efficiently execute the query request and minimize (or eliminate) the cache misses that occur when servicing the query request.

In order to balance the use of the cache between query requests and query requests associated with hidden subscriptions, not all query requests may be associated with hidden subscriptions. Rather, hidden subscriptions may only be created for a subset of query requests. For example, a hidden subscription may be created for: (i) a query request that is issued every day by multiple different clients; (ii) a set of different query requests that are concurrently issued every day during the same time window (e.g., every day at 9 am) (see Example 2 below); or (iii) a query request that is not issued very often but when issued will result in a substantial use of computing resources (e.g., the query request requires consideration of over 1,000,000 user data values) (see Example 3 below). Hidden subscriptions may be generated for other query requests without departing from the invention.

Example 2

A set of hidden subscriptions may be created fir a set of 100 query requests (each of which may be different) are issued every day at the same time window. While the 100 query requests may not all be the same, their concurrent execution may result in a substantial load being placed on the query system. Accordingly, if all of some of the query requests may be performed prior to the identified time window (e.g., before 9 am), then the computational load on the query system may be spread across a larger period of time. This may result in at least two benefits: (i) the clients that issue the query requests will benefit from improved efficiency in execution of their query requests during their normal time window (e.g., at 9 am) because most of the data required to service their query requests is cached; and (ii) other query requests that are executing in the query system will have greater access to computational resources during the time window as processing the 100 query requests will require fewer computational resources of the query system.

End of Example 2

Example 3

A hidden subscription may be created for a query request in which the computational cost of maintaining the current value of a target sub-region associated with the query request in cache is substantially less computationally expensive than calculating the value of target sub-region when the query request is serviced. For example, consider a scenario in which the target sub-region specifies the sum of values in a user data sub-region. If a value in the user data sub-region changes, then the new value in the target sub-region may be calculated by summing the current value of the target sub-region with the new value in the user data sub-region if the target sub-region is kept up to date. However, if the target sub-region is not kept up to date, then the entire user data sub-region will need to be processed to obtain the correct value of the target sub-region. Accordingly, by creating a hidden subscription for this query request, the target sub-region is kept up to date, thereby decrease the computational load on the query system when a query request for the target sub-region received from a client.

End of Example 3

Figure 7:
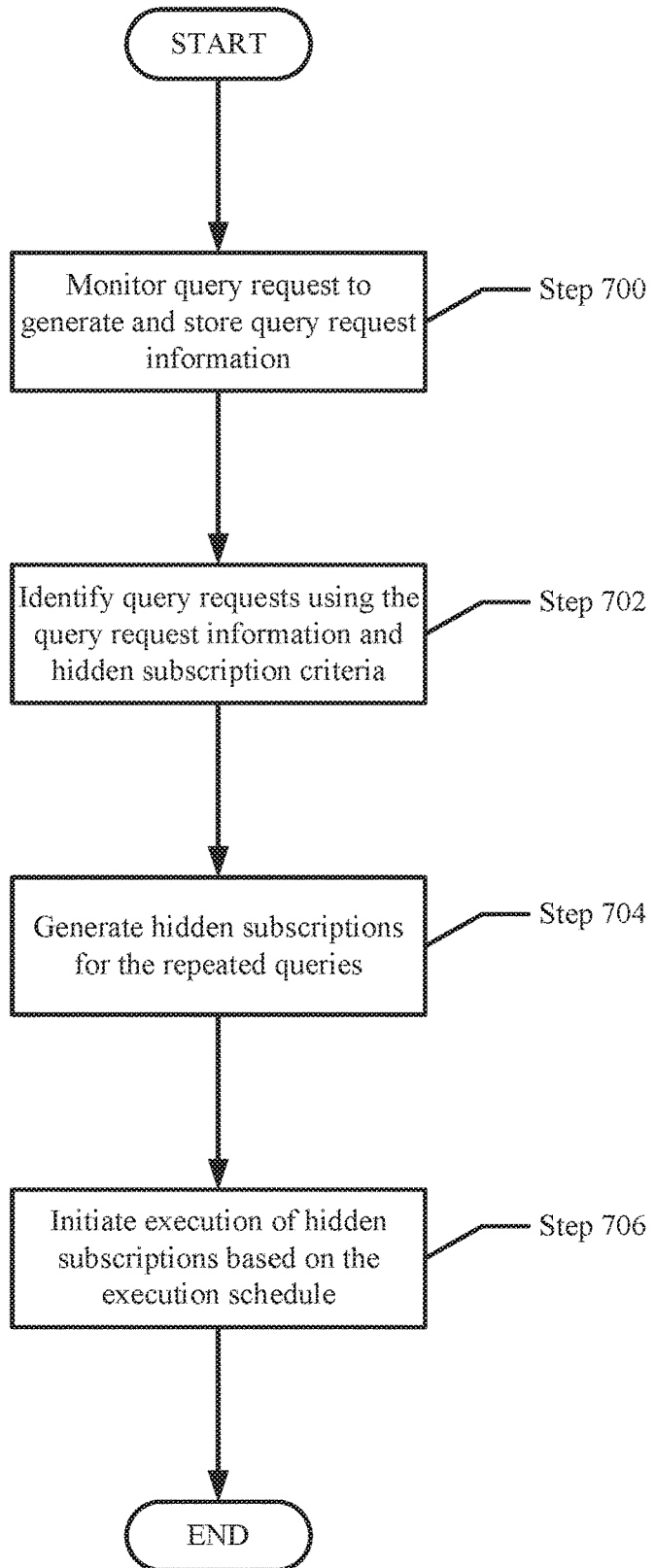
FIG. 7 shows a flowchart for generating hidden subscriptions in accordance with one or more embodiments of the invention.

FIG. 7 shows a flowchart for generating hidden subscriptions in accordance with one or more embodiments of the invention. The method shown in FIG. 7 may be performed by the subscription engine. Other components in the query system may perform the method shown in FIG. 7 without departing from the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5-7 may be performed in parallel with any other steps shown in FIGS. 5-7 without departing from the scope of the invention.

In step 700, query requests that are serviced by the query system (excluding subscriptions) are monitored and the corresponding query request information is stored. The query request information may include, among other information, (i) the query request (which specifies a target sub-region) and (ii) the time the query request was issued to the query system. The aforementioned query request information may be stored in an in-memory data structure and/or a data structure stored in persistent storage.

In step 702, query requests are identified using the query request information and one or more hidden subscription criterion. The hidden subscription criterion may specify a minimum number of times query request has been issued within a certain time period (e.g., 100 times per day) or if it is repeated the same time every day (see e.g., Example 2 above). Other hidden subscription threshold criterion or criteria may be used to identify query requests for which a hidden subscription should be created (see e.g., Example 3 above). In one embodiment of the invention, machine learning may be used to identify query requests for which hidden subscriptions should be generated.

In step 704, a hidden subscription is created for each of the query requests identified in step 702. The hidden subscription includes a query request along with a subscription trigger. Depending on the query request, the subscription trigger may be a change is user data that is associated with the subscription (see e.g., FIG. 5, Step 504, 506) and/or the occurrence of a particular time (e.g., a 7:45 am every weekday). Other subscription triggers may be used without departing from the invention.

In scenarios in which the subscription trigger is a time-based trigger, the subscription trigger for a given hidden subscription may be based on the subscription triggers for other hidden subscriptions. The timing the execution of the hidden subscriptions may be collectively referred to as an execution schedule.

For example, in the scenario contemplated by Example 2 above, if 100 hidden subscriptions are created, the time-based subscription triggers are created such that they spread the execution of the 100 hidden subscriptions over a period of time such all of them execute prior to when the client typically issue the query requests (e.g., prior to 9 am) and are triggered at varying times such that the impact computational load on the query system is mitigated. For example, the time-based subscription triggers may be set such that groupings of 25 query requests are issued to the query system starting at 7 am on weekdays at 15 minute intervals. This will result in 25 query requests being issued at each of 7 am, 7:15 am, 7:30 am, and 7:45 am. Thus, by 8 am all 100 query requests associated with the hidden subscriptions have been executed by the query system. The aforementioned scheduling of the 100 query requests is an example of an execution schedule. This example is not intended to limit the scope of the invention.

Those skilled in the art will appreciate that the execution schedule will not apply to hidden subscriptions that are not based on a time-based subscription trigger.

Continuing with the discussion of FIG. 7, in step 706, the subscription engine (or another component in the query system that is configured to manage the hidden subscriptions) stores the hidden subscriptions and initiates their execution based on the execution schedule (or on another subscription trigger). The execution of the hidden subscriptions may be performed with or without the use of subscription barriers.

Figure 8:
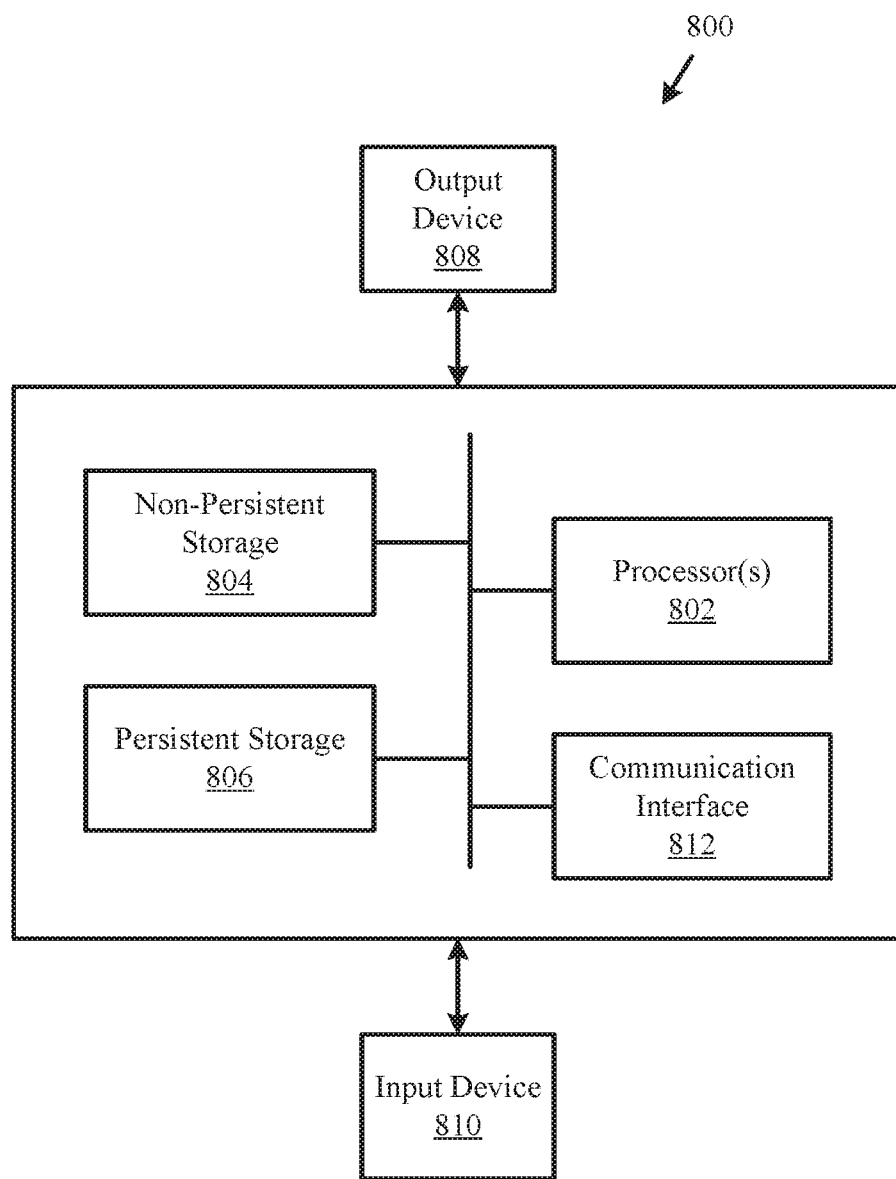
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention may be implemented using instructions executed by one or more processors of the computing device. Further, such instructions may correspond to computer readable instructions that are stored on one or more non-transitory computer readable mediums.

Embodiments of the invention may improve data processing technology for very large data sets. Specifically, embodiments of the invention may improve the processing by, example: (i) only requiring user data to be stored in persistent storage as opposed to requiring all derived data to be stored in persistent storage thereby reducing the amount of persistent storage required to implement the query system; (ii) implementing a query system that only requires derived data to be calculated in response to a query request as instead of updating the derived data each time there is an updated to any user data thereby reducing the computing overhead required in query systems in which user data is frequently updated; (iii) by using strong versioning and a data flow graph that specifies the relationships between sub-regions, a consistent query result may be generated for a given target region using a specific revisions map; (iv) by using subscription barriers to limit the execution of unnecessary query requests thereby reducing the computational load the query system; and (v) by using hidden subscriptions as a method for managing the contents of the caches in the query system in order to decrease the cache misses that occur when processing query requests.

The improvement to the data processing technology by various embodiments of the invention discussed above should be understood as being examples of improvements to the technology and should not be limit the invention is any manner.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing subscriptions, comprising:
monitoring, by a database management system (DBMS), a plurality of query requests executing on a plurality of query nodes, wherein the plurality of query requests is for data stored on a persistent storage;
identifying, by the DBMS, based on the monitoring, a query request of the plurality of query requests that satisfies a hidden subscription criterion;
generating, by the DBMS, a hidden subscription for the query request, the hidden subscription is executed based on a hidden subscription trigger; and
in response to the hidden subscription trigger being activated by the query request:
determining, by the DBMS, that a query result associated with the query request is different than a latest query result of the query request, and
initiating, by the DMBS, execution of the hidden subscription on one of the plurality of query nodes to generate a query response comprising the query result,
wherein the query response is not provided to a client, and
wherein the hidden subscription maintains query results associated with the query request in at least one cache.

2. The method of claim 1, wherein the hidden subscription trigger specifies an execution time.

3. The method of claim 1, wherein the hidden subscription trigger specifies an execution day and time.

4. The method of claim 1, wherein the hidden subscription trigger specifies an execution schedule.

5. The method of claim 1, wherein the hidden subscription trigger specifies a modified user data sub-region.

6. The method of claim 1, wherein the query request is identified using machine learning.

7. The method of claim 1, wherein the hidden subscription criterion specifies a number of times the query request has been execution within a certain time period.

8. The method of claim 1, wherein the hidden subscription criterion specifies an amount of computing resources on the plurality of query nodes that is required to execute the query request.

9. A non-transitory computer readable medium comprising computer readable program code, which when executed by a computer processor enables the computer processor to perform a method for managing subscriptions, the method comprising:
monitoring, by a database management system (DBMS), a plurality of query requests executing on a plurality of query nodes, wherein the plurality of query requests is for data stored on a persistent storage;
identifying, by the DBMS, based on the monitoring, a query request of the plurality of query requests that satisfies a hidden subscription criterion;
generating, by the DBMS, a hidden subscription for the query request, the hidden subscription is executed based on a hidden subscription trigger; and
in response to the hidden subscription trigger being activated by the query request:
determining, by the DBMS, that a query result associated with the query request is different than a latest query result of the query request, and
initiating, by the DMBS, execution of the hidden subscription on one of the plurality of query nodes to generate a query response comprising the query result,
wherein the query response is not provided to a client, and
wherein the hidden subscription maintains query results associated with the query request in at least one cache.

10. The non-transitory computer readable medium of claim 9, wherein the hidden subscription trigger specifies an execution time.

11. The non-transitory computer readable medium of claim 9, wherein the hidden subscription trigger specifies an execution day and time.

12. The non-transitory computer readable medium of claim 9, wherein the hidden subscription trigger specifies an execution schedule.

13. The non-transitory computer readable medium of claim 9, wherein the hidden subscription trigger specifies a modified user data sub-region.

14. The non-transitory computer readable medium of claim 9, wherein the query request is identified using machine learning.

15. The non-transitory computer readable medium of claim 9, wherein the hidden subscription criterion specifies a number of times the query request has been execution within a certain time period.

16. The non-transitory computer readable medium of claim 9, wherein the hidden subscription criterion specifies an amount of computing resources on the plurality of query nodes that is required to execute the query request.

* * * * *